US012563123B2

(12) United States Patent
Thiebaut et al.

(10) Patent No.: US 12,563,123 B2
(45) Date of Patent: Feb. 24, 2026

(54) METHOD, APPARATUS, AND COMPUTER PROGRAM PRODUCT FOR ENLARGING USAGE OF USER CATEGORY WITHIN A CORE NETWORK

(71) Applicant: Nokia Technologies Oy, Espoo (FI)

(72) Inventors: Laurent Thiebaut, Massy (FR);
Shubhranshu Singh, Munich (DE);
Yannick Lair, Massy (FR)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/247,586

(22) PCT Filed: Sep. 29, 2021

(86) PCT No.: PCT/EP2021/076852
§ 371 (c)(1),
(2) Date: Mar. 31, 2023

(87) PCT Pub. No.: WO2022/069580
PCT Pub. Date: Apr. 7, 2022

(65) Prior Publication Data
US 2023/0388386 A1     Nov. 30, 2023

Related U.S. Application Data

(60) Provisional application No. 63/087,064, filed on Oct. 2, 2020.

(51) Int. Cl.
*H04L 67/147* (2022.01)
*H04W 24/02* (2009.01)

(52) U.S. Cl.
CPC ........... *H04L 67/147* (2013.01); *H04W 24/02* (2013.01)

(58) Field of Classification Search
None
See application file for complete search history.

(56) References Cited

U.S. PATENT DOCUMENTS

| | | | |
|---|---|---|---|
| 11,039,019 B1 * | 6/2021 | Yan | ..................... H04L 12/1407 |
| 2015/0223042 A1 * | 8/2015 | Li | ......................... H04M 15/66 |
| | | | 455/406 |

(Continued)

FOREIGN PATENT DOCUMENTS

| | | |
|---|---|---|
| CA | 3120013 A1 | 5/2020 |
| WO | 2020/074126 A1 | 4/2020 |

OTHER PUBLICATIONS

"3rd Generation Partnership Project; Technical Specification Group Core Network and Terminals; 5G System; Network Exposure Function Northbound APIs; Stage 3 (Release 16)", 3GPP TS 29.522, V16.4.0, Jun. 2020, pp. 1-159.

(Continued)

*Primary Examiner* — Oleg Survillo
*Assistant Examiner* — Christopher P Cadorna
(74) *Attorney, Agent, or Firm* — Lippes Mathias LLP

(57) ABSTRACT

A method, apparatus, and computer program product are provided for enhanced traffic routing. A method can include receiving, from a network function consumer or an application function, in a communications system, an analytics subscription request, the analytics subscription request comprising one or more subscriber categories and/or one or more allowed services; and causing transmission of an event exposure request to at least one network function, the event exposure request comprising the one or more subscriber categories and/or the one or more allowed services.

14 Claims, 13 Drawing Sheets

<u>100</u>

(56) References Cited

U.S. PATENT DOCUMENTS

| 2022/0191100 A1* | 6/2022 | Kim | H04M 15/66 |
| 2022/0210698 A1* | 6/2022 | Ly | H04W 4/70 |

OTHER PUBLICATIONS

"3rd Generation Partnership Project; Technical Specification Group Services and System Aspects; System architecture for the 5G System (5GS); Stage 2 (Release 16)", 3GPP TS 23.501, V16.6.0, Sep. 2020, pp. 1-447.

"3rd Generation Partnership Project; Technical Specification Group Services and System Aspects; Study on enhancement of support for Edge Computing in 5G Core network (5GC) (Release 17)", 3GPP TR 23.748, V1.0.0, Sep. 2020, 234 pages.

"3rd Generation Partnership Project; Technical Specification Group Services and System Aspects; Architecture enhancements for 5G System (5GS) to support network data analytics services (Release 16)", 3GPP TS 23.288, V16.5.0, Sep. 2020, pp. 1-66.

"3rd Generation Partnership Project; Technical Specification Group Services and System Aspects; Study on enablers for network automation for the 5G System (5GS); Phase 2 (Release 17)", 3GPP TR 23.700-91, V1.0.0, Sep. 2020, pp. 1-304.

"IEEE 802.11", Wikipedia, Retrieved on Apr. 28, 2023, Webpage available at : https://en.wikipedia.org/wiki/IEEE_802.11.

"IEEE 802.16", Wikipedia, Retrieved on Apr. 28, 2023, Webpage available at : https://en.wikipedia.org/wiki/IEEE_802.16.

"IEEE 802.16", Wikipedia, Retrieved on Apr. 28, 2023, Webpage available at : https://en.wikipedia.org/wiki/IEEE_802.3.

"3rd Generation Partnership Project; Technical Specification Group Services and System Aspects; Policy and charging control frame-work for the 5G System (5GS); Stage 2 (Release 16)", 3GPP TS 23.503, V16.6.0, Sep. 2020, pp. 1-118.

"3rd Generation Partnership Project; Technical Specification Group Services and System Aspects; Procedures for the 5G System (5GS); Stage 2 (Release 16)", 3GPP TS 23.502, V16.5.1, Aug. 2020, pp. 1-594.

Invitation to Pay Additional Fees received for corresponding Patent Cooperation Treaty Application No. PCT/EP2021/076852, dated Feb. 7, 2022, 14 pages.

"KI #9, Solution Completion: Dispersion Analytic Output Provided by NWDAF", 3GPP SA WG2 Meeting #140E, 82-2006258, Agenda: 8.1, Spirent Comm, Aug. 19-Sep. 2, 2020, 19 pages.

"KI#10, New Sol: NWDAF assistance to support UP optimization", SA WG2 Meeting #140E (e-meeting), S2-2006261, Agenda: 8.1, LG Electronics, Aug. 19-Sep. 1, 2020, 8 pages.

International Search Report and Written Opinion received for corresponding Patent Cooperation Treaty Application No. PCT/EP2021/076852, dated May 11, 2022, 26 pages.

"3rd Generation Partnership Project; Technical Specification Group Core Network and Terminals; 5G System; Policy and Charging Control signalling flows and QoS parameter mapping; Stage 3 (Release 17)", 3GPP TS 29.513, V17.0.0, Sep. 2020, pp. 1-145.

"New solution for KI#15", SA WG2 Meeting #131, S2-1901807, Agenda: 6.6, LG Electronics, Feb. 25-Mar. 1, 2019, 12 pages.

"3rd Generation Partnership Project; Technical Specification Group Services and System Aspects; Study of Enablers for Network Automation for 5G (Release 16)", 3GPP TR 23.791, V16.2.0, Jun. 2019, pp. 1-124.

"KI#12, New Solution: Reusing Service Experience Analytics", SA WG2 Meeting #139E, S2-2004555, Agenda: 8.1, Ericsson, Jun. 1-12, 2020, 4 pages.

* cited by examiner

200

204

Memory

202

Processor

206

Communication Interface

900 receiving, from a network function consumer or an application function, in a communications system, an analytics subscription request, the analytics subscription request comprising one or more subscriber categories and/or one or more allowed services

901 causing transmission of an event exposure request to at least one network function, the event exposure request comprising the one or more subscriber categories and/or the one or more allowed services

902

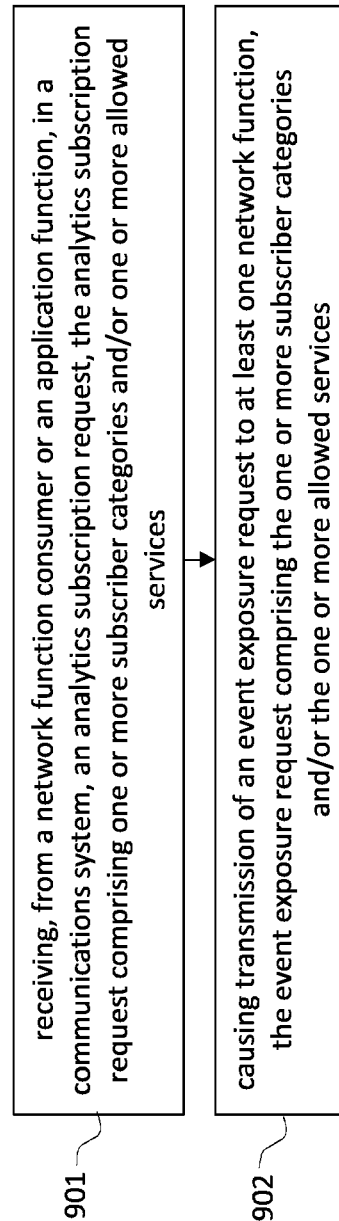

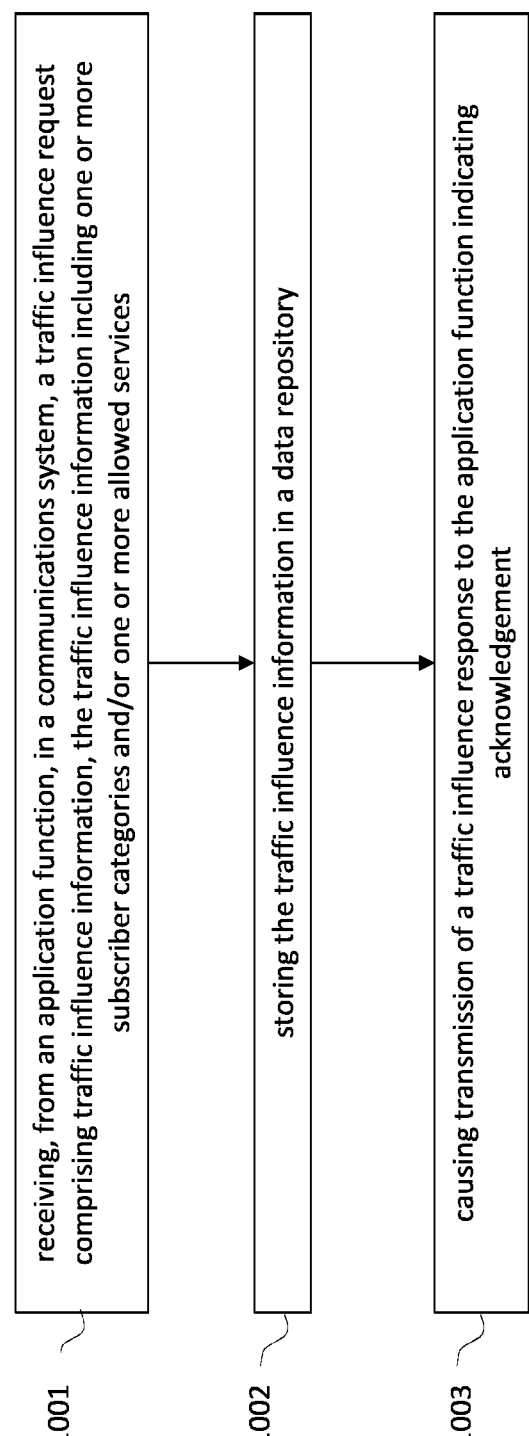

receiving, from an application function, in a communications system, a traffic influence request comprising traffic influence information, the traffic influence information including one or more subscriber categories and/or one or more allowed services

1001 storing the traffic influence information in a data repository

1002 causing transmission of a traffic influence response to the application function indicating acknowledgement

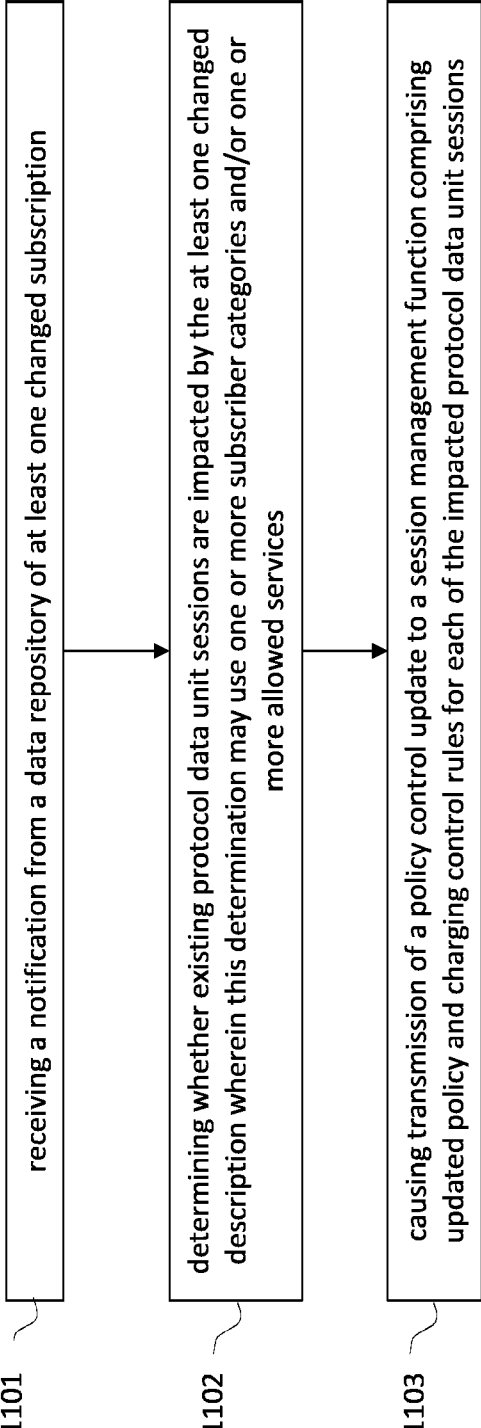

1100

1101 — receiving a notification from a data repository of at least one changed subscription 1102 — determining whether existing protocol data unit sessions are impacted by the at least one changed description wherein this determination may use one or more subscriber categories and/or one or more allowed services 1103 — causing transmission of a policy control update to a session management function comprising updated policy and charging control rules for each of the impacted protocol data unit sessions

FIG. 11

1200 receiving, from an application function, in a communications system, an analytics influence request comprising analytics influence information, the analytics influence information including one or more subscriber categories and/or one or more allowed services

1201 storing the analytics influence information in a data repository

1202 causing transmission of an analytics influence response to the application function indicating acknowledgement

1203

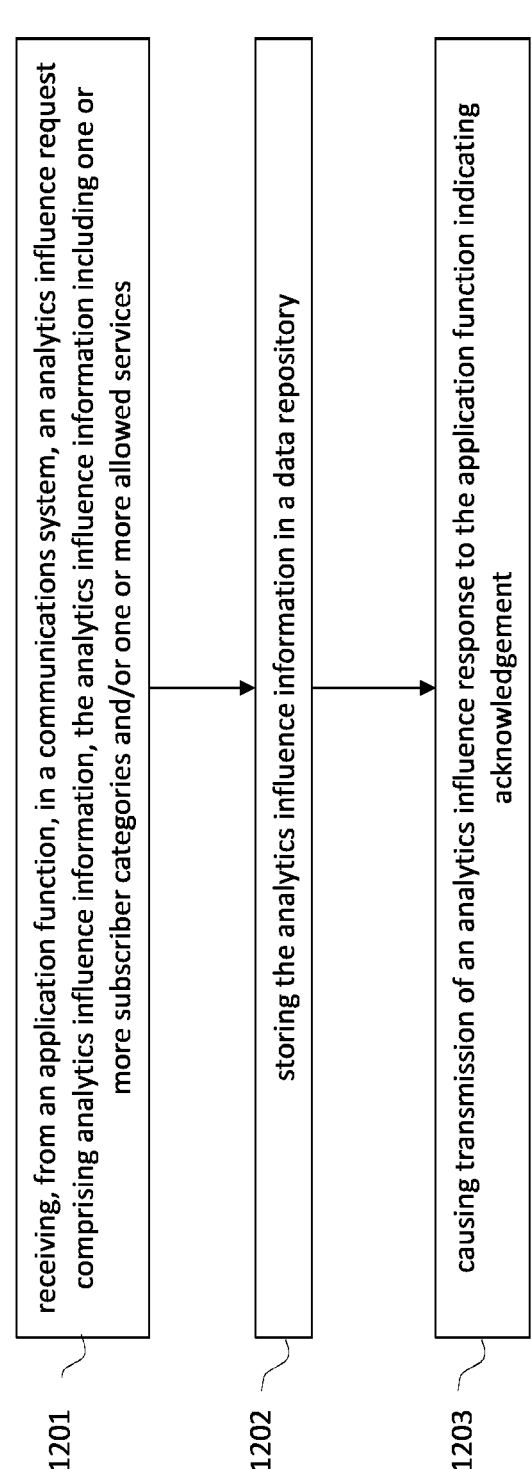

FIG. 12

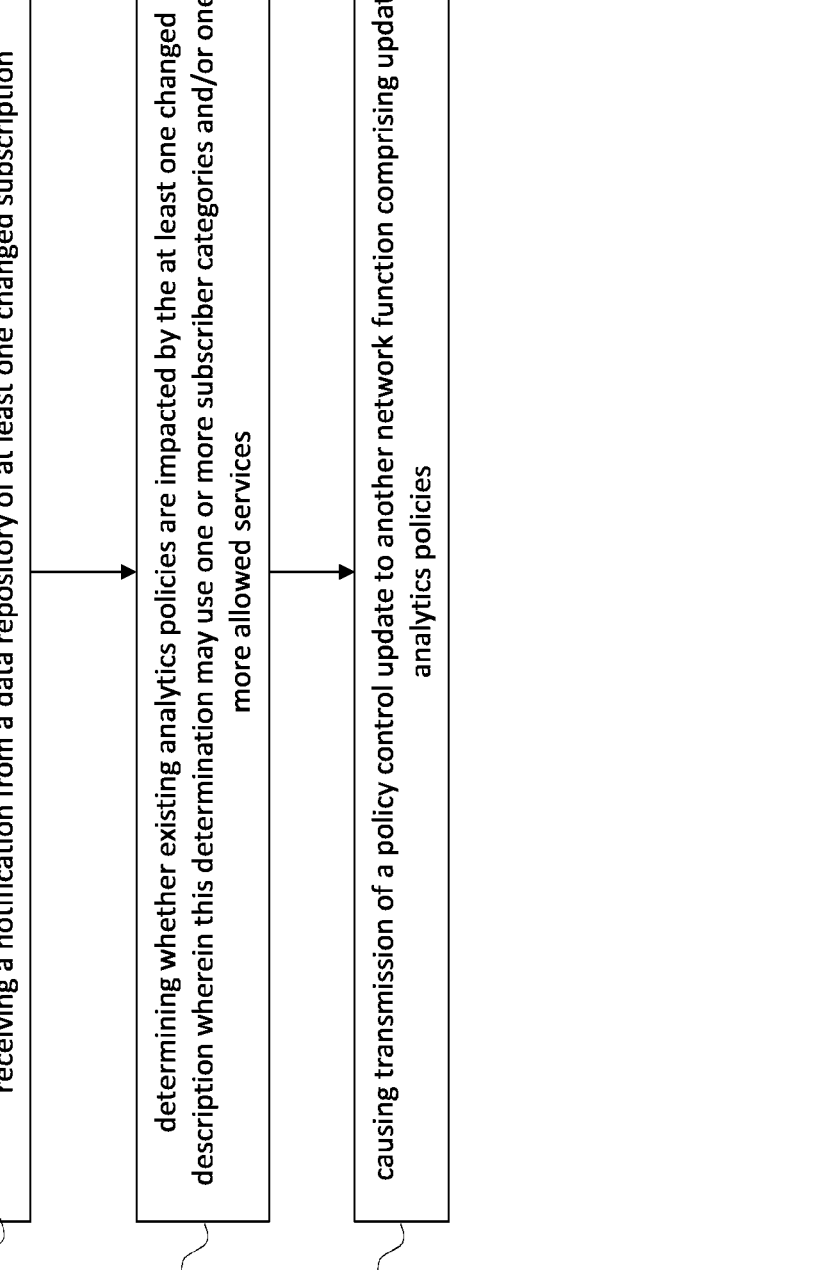

1300

1301    receiving a notification from a data repository of at least one changed subscription 1302    determining whether existing analytics policies are impacted by the at least one changed description wherein this determination may use one or more subscriber categories and/or one or more allowed services 1303    causing transmission of a policy control update to another network function comprising updated analytics policies

FIG. 13

METHOD, APPARATUS, AND COMPUTER PROGRAM PRODUCT FOR ENLARGING USAGE OF USER CATEGORY WITHIN A CORE NETWORK

CROSS-REFERENCE TO RELATED APPLICATION

This application is a national stage application, filed under 35 U.S.C. § 371, of International Patent Application No. PCT/EP2021/076852, filed Sep. 29, 2021, which claims priority to U.S. Provisional Patent Application No. 63/087,064, filed Oct. 2, 2020, each of which is incorporated herein by reference in its entirety.

TECHNOLOGICAL FIELD

An example embodiment relates generally to traffic routing for a session, such as a Protocol Data Unit (PDU) session, in a communication network, such as a $3^{rd}$ generation partnership project (3GPP) $5^{th}$ generation (5G) communication network.

BACKGROUND

A communication system can be seen as a facility that enables communication sessions between two or more entities such as user equipment, base stations/access points, Network Functions (NF), and/or other nodes by providing connectivity between the various entities involved in the communication path. A communication system can be provided, for example, with a communication network and one or more compatible communication devices.

Telecommunication networks continue to evolve and the $5^{th}$ generation of mobile networks (5G networks) is now expected to be the next major phase of mobile telecommunication standards and to bring many improvements in the mobile network user experience. For instance, 5G networks should provide new technical solutions allowing a greater throughput, lower latency, higher reliability, higher connectivity, and higher mobility range. In addition to these improvements in terms of performance, 5G networks are also expected to extend the flexibility in the network usage and to provide users with a wider range of use cases and business models.

The $3^{rd}$ Generation Partnership Project (3GPP) is a standards organization which develops protocols for mobile telephony and is known for the development and maintenance of various standards including $2^{nd}$ generation (2G), $3^{rd}$ generation (3G), $4^{th}$ generation (4G), Long Term Evolution (LTE), and $5^{th}$ generation (5G) standards. The 5G network has been designed as a Service Based Architecture (SBA), e.g., a system architecture in which the system functionality is achieved by a set of NFs providing services to other NFs authorized to access their services. The 5G network allows for the support of emergency services fallback registration between a User Equipment (UE) and an Access and Mobility Management Function (AMF).

BRIEF SUMMARY

A method, apparatus, and computer program product are provided for enhanced traffic routing. According to a first embodiment, a method is provided that comprises: receiving, from a network function consumer or an application function, in a communications system, an analytics subscription request. The analytics subscription request comprising one or more subscriber categories and/or one or more allowed services. In some embodiments, the method can further comprise causing transmission of an event exposure request to at least one network function. The event exposure request comprising the one or more subscriber categories and/or the one or more allowed services.

In some embodiments, the method can further comprise collecting data specific to user equipment corresponding to the one or more subscriber categories and/or the one or more allowed services from other network functions, the collection of the one or more subscriber categories and/or the one or more allowed services from other network functions and the at least one network function being operable to cause the other network functions and the at least one network function to track a corresponding set of particular user equipment.

The method can further comprise receiving policy control data including information about the user related to the one or more subscriber categories related with the user and/or related to the one or more allowed services subscribed for the user. In some embodiments, the one or more subscriber categories comprises one or more category identifiers associated with a subscriber. In some embodiments, the one or more allowed services comprises one or more allowed service identifiers.

According to a second embodiment, a method is provided that comprises receiving, from an application function, in a communications system, a traffic influence request comprising traffic influence information. The traffic influence information includes one or more subscriber categories and/or one or more allowed services. In some embodiments the method further comprises storing the traffic influence information in a data repository and causing transmission of a traffic influence response to the application function indicating acknowledgement.

According to a third embodiment, a method is provided that comprises: receiving a notification from a data repository of at least one changed subscription, determining whether existing protocol data unit sessions are impacted by the at least one changed description wherein this determination may use one or more subscriber categories and/or one or more allowed services, and causing transmission of a policy control update to a session management function comprising updated policy and charging control rules for each of the impacted protocol data unit sessions. In some embodiments, the session management function is operable to cause changes in a user plane management information in response to the updated policy and charging control rules for each of the impacted protocol data unit sessions.

According to a fourth embodiment, a method is provided that comprises receiving, from an application function, in a communications system, an analytics influence request comprising analytics influence information. The analytics influence information includes one or more subscriber categories and/or one or more allowed services. In some embodiments the method further comprises storing the analytics influence information in a data repository and causing transmission of an analytics influence response to the application function indicating acknowledgement.

According to a fifth embodiment, a method is provided that comprises: receiving a notification from a data repository of at least one changed subscription, determining whether existing analytics policies are impacted by the at least one changed description wherein this determination may use one or more subscriber categories and/or one or more allowed services, and causing transmission of a policy control update to another network function comprising updated analytics policies. In some embodiments, the another network function is operable to cause changes in analytics requests in response to the updated analytics policy.

According to a sixth embodiment, an apparatus is provided that comprises: at least one processor; and at least one memory including computer program code, the at least one memory and the computer program code configured to, with the at least one processor, cause the apparatus at least to: receive, from a network function consumer or an application function, in a communications system, an analytics subscription request, and cause transmission of an event exposure request to at least one network function.

In some embodiments, the at least one memory and the computer program code are further configured to, with the at least one processor, cause the apparatus to collect data specific to user equipment corresponding to the one or more subscriber categories and/or the one or more allowed services from other network functions, the collection of the one or more subscriber categories and/or the one or more allowed services from other network functions and the at least one network function being operable to cause the other network functions and the at least one network function to track a corresponding set of particular user equipment.

The at least one memory and the computer program code are further configured to, with the at least one processor, cause the apparatus to receive policy control data including information about the user related to the one or more subscriber categories related with the user and/or related to the one or more allowed services subscribed for the user.

According to a seventh embodiment, an apparatus is provided that comprises: at least one processor; and at least one memory including computer program code, the at least one memory and the computer program code configured to, with the at least one processor, cause the apparatus at least to receive, from an application function, in a communications system, a traffic influence request comprising traffic influence information. In some embodiments the at least one memory and the computer program code are further configured to, with the at least one processor, cause the apparatus to store the traffic influence information in a data repository and causing transmission of a traffic influence response to the application function indicating acknowledgement.

According to an eighth embodiment, an apparatus is provided that comprises: at least one processor; and at least one memory including computer program code, the at least one memory and the computer program code configured to: receive a notification from a data repository of at least one changed subscription, determine whether existing protocol data unit sessions are impacted by the at least one changed description wherein this determination may use one or more subscriber categories and/or one or more allowed services, and cause transmission of a policy control update to a session management function comprising updated policy and charging control rules for each of the impacted protocol data unit sessions. In some embodiments, the session management function is operable to cause changes in a user plane management information in response to the updated policy and charging control rules for each of the impacted protocol data unit sessions.

According to a ninth embodiment, an apparatus is provided that comprises: at least one processor; and at least one memory including computer program code, the at least one memory and the computer program code configured to receive, from an application function, in a communications system, an analytics influence request comprising analytics influence information, store the analytics influence information in a data repository, and cause transmission of an analytics influence response to the application function indicating acknowledgement.

According to a tenth embodiment, an apparatus is provided that comprises: at least one processor; and at least one memory including computer program code, the at least one memory and the computer program code configured to receive a notification from a data repository of at least one changed subscription, determine whether existing analytics policies are impacted by the at least one changed description wherein this determination may use one or more subscriber categories and/or one or more allowed services, and cause transmission of a policy control update to another network function comprising updated analytics policies. In some embodiments, the another network function is operable to cause changes in analytics requests in response to the updated analytics policy.

According to an eleventh embodiment, a computer program product is provided that comprising a non-transitory computer readable storage medium having program code portions stored thereon, the program code portions configured, upon execution, to: receive, from a network function consumer or an application function, in a communications system, an analytics subscription request, and cause transmission of an event exposure request to at least one network function.

In some embodiments, the program code portions are further configured to collect data specific to user equipment corresponding to the one or more subscriber categories and/or the one or more allowed services from other network functions, the collection of the one or more subscriber categories and/or the one or more allowed services from other network functions and the at least one network function being operable to cause the other network functions and the at least one network function to track a corresponding set of particular user equipment.

The program code portions are further configured to receive policy control data including information about the user related to the one or more subscriber categories related with the user and/or related to the one or more allowed services subscribed for the user.

According to a twelfth embodiment, a computer program product is provided that comprising a non-transitory computer readable storage medium having program code portions stored thereon, the program code portions configured, upon execution, to receive, from an application function, in a communications system, a traffic influence request comprising traffic influence information. In some embodiments the program code portions are further configured to store the traffic influence information in a data repository and causing transmission of a traffic influence response to the application function indicating acknowledgement.

According to a thirteenth embodiment, a computer program product is provided that comprising a non-transitory computer readable storage medium having program code portions stored thereon, the program code portions configured, upon execution, to: receive a notification from a data repository of at least one changed subscription, determine whether existing protocol data unit sessions are impacted by the at least one changed description wherein this determination may use one or more subscriber categories and/or one or more allowed services, and cause transmission of a policy control update to a session management function comprising updated policy and charging control rules for each of the impacted protocol data unit sessions. In some embodiments, the session management function is operable to cause changes in a user plane management information in response to the updated policy and charging control rules for each of the impacted protocol data unit sessions.

According to a fourteenth embodiment, a computer program product is provided that comprising a non-transitory computer readable storage medium having program code portions stored thereon, the program code portions configured, upon execution, to receive, from an application function, in a communications system, an analytics influence request comprising analytics influence information, store the analytics influence information in a data repository, and cause transmission of an analytics influence response to the application function indicating acknowledgement.

According to a fifteenth embodiment, a computer program product is provided that comprising a non-transitory computer readable storage medium having program code portions stored thereon, the program code portions configured, upon execution, to receive a notification from a data repository of at least one changed subscription, determine whether existing analytics policies are impacted by the at least one changed description wherein this determination may use one or more subscriber categories and/or one or more allowed services, and cause transmission of a policy control update to another network function comprising updated analytics policies. In some embodiments, the another network function is operable to cause changes in analytics requests in response to the updated analytics policy.

According to a sixteenth embodiment, an apparatus is provided that comprises: means for receiving, from a network function consumer or an application function, in a communications system, an analytics subscription request. In some embodiments, the apparatus can further comprise means for causing transmission of an event exposure request to at least one network function.

In some embodiments, the apparatus can further comprise means for collecting data specific to user equipment corresponding to the one or more subscriber categories and/or the one or more allowed services from other network functions, the collection of the one or more subscriber categories and/or the one or more allowed services from other network functions and the at least one network function being operable to cause the other network functions and the at least one network function to track a corresponding set of particular user equipment. The apparatus can further comprise means for receiving policy control data including information about the user related to the one or more subscriber categories related with the user and/or related to the one or more allowed services subscribed for the user.

According to a seventeenth embodiment, an apparatus is provided that comprises means for receiving, from an application function, in a communications system, a traffic influence request comprising traffic influence information. In some embodiments the apparatus further comprises means for storing the traffic influence information in a data repository and causing transmission of a traffic influence response to the application function indicating acknowledgement.

According to a eighteenth embodiment, an apparatus is provided that comprises: means for receiving a notification from a data repository of at least one changed subscription, means for determining whether existing protocol data unit sessions are impacted by the at least one changed description wherein this determination may use one or more subscriber categories and/or one or more allowed services, and causing transmission of a policy control update to a session management function comprising updated policy and charging control rules for each of the impacted protocol data unit sessions. In some embodiments, the session management function is operable to cause changes in a user plane management information in response to the updated policy and charging control rules for each of the impacted protocol data unit sessions.

According to a nineteenth embodiment, an apparatus is provided that comprises means for receiving, from an application function, in a communications system, an analytics influence request comprising analytics influence information. The analytics influence information includes one or more subscriber categories and/or one or more allowed services. In some embodiments the apparatus further comprises means for storing the analytics influence information in a data repository and causing transmission of an analytics influence response to the application function indicating acknowledgement.

According to a twentieth embodiment, an apparatus is provided that comprises: means for receiving a notification from a data repository of at least one changed subscription, means for determining whether existing analytics policies are impacted by the at least one changed description wherein this determination may use one or more subscriber categories and/or one or more allowed services, and causing transmission of a policy control update to another network function comprising updated analytics policies. In some embodiments, the another network function is operable to cause changes in analytics requests in response to the updated analytics policy.

BRIEF DESCRIPTION OF THE DRAWINGS

Figure 1:
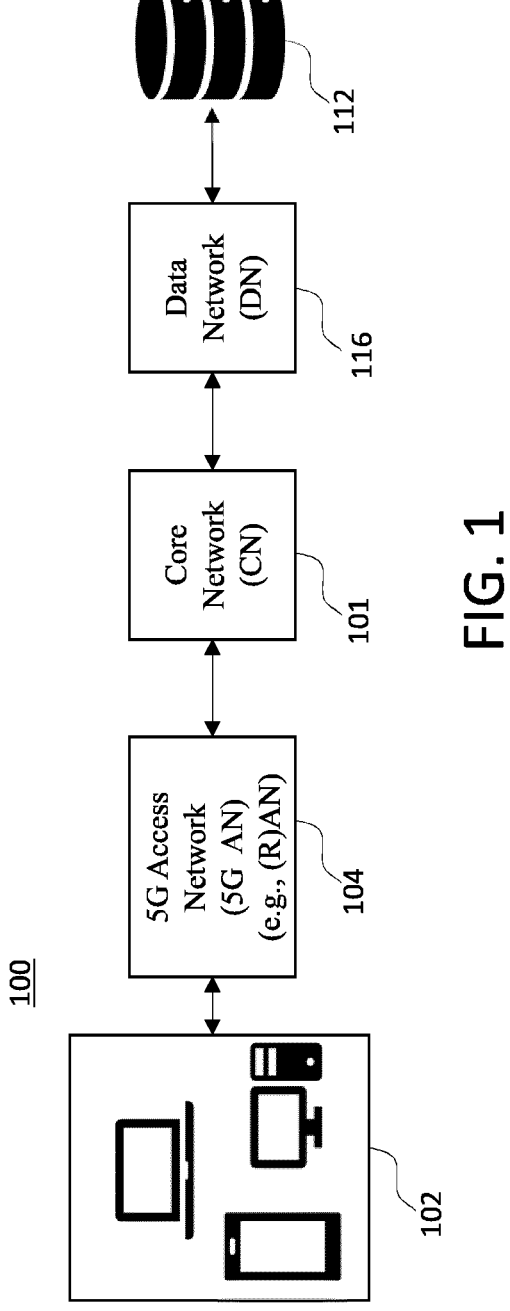
Figure 2:
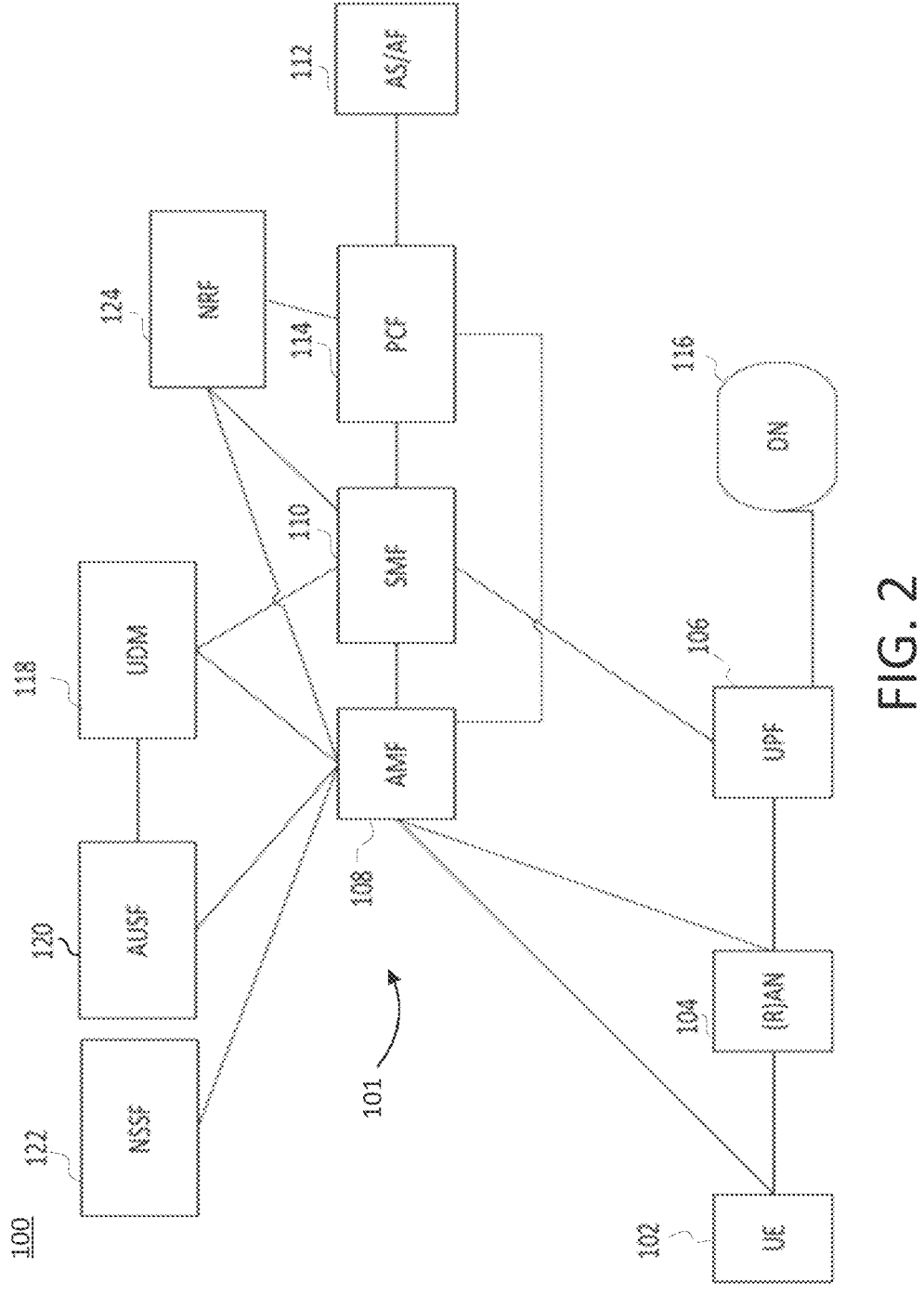
Figure 3:
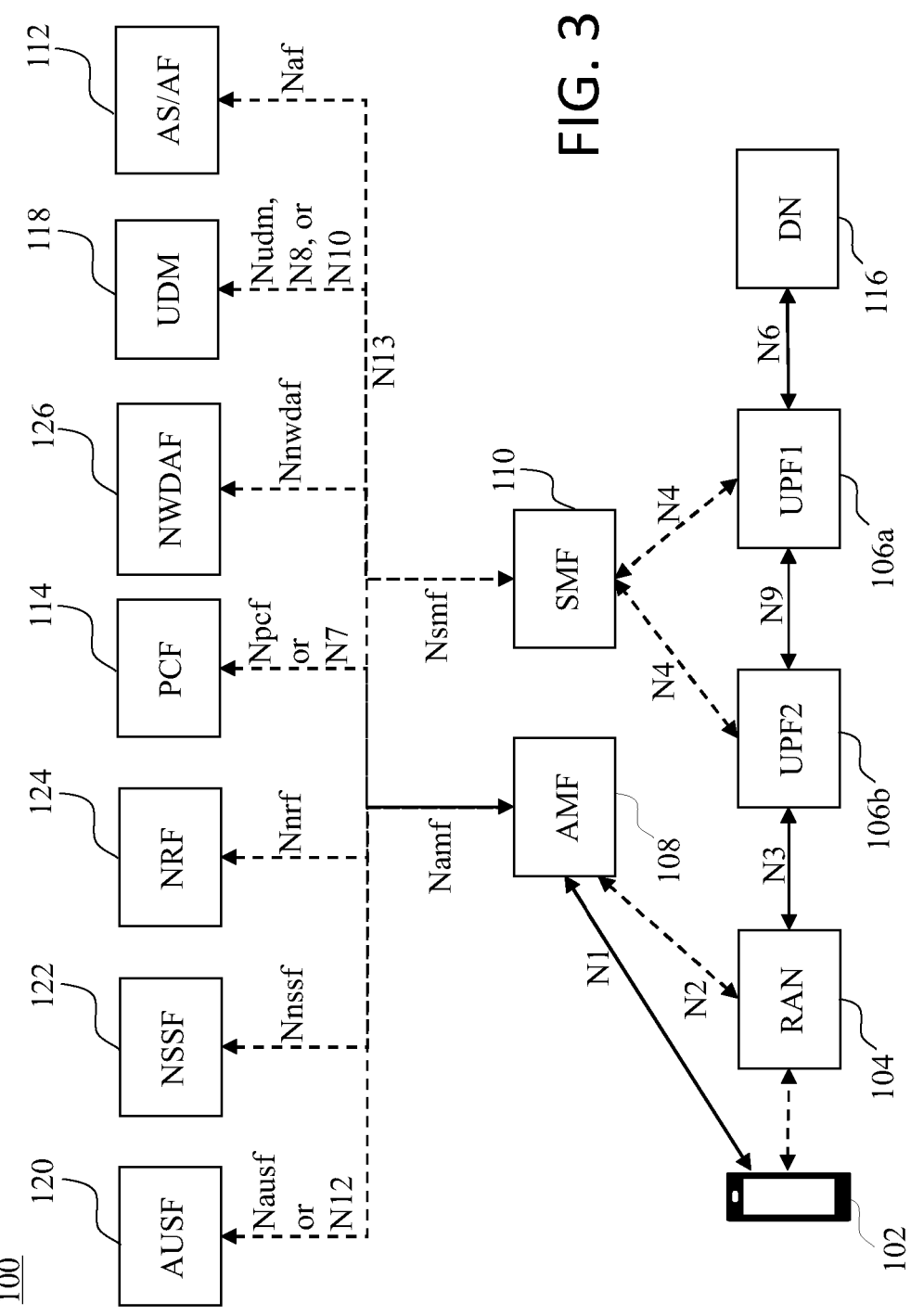
Figure 4:
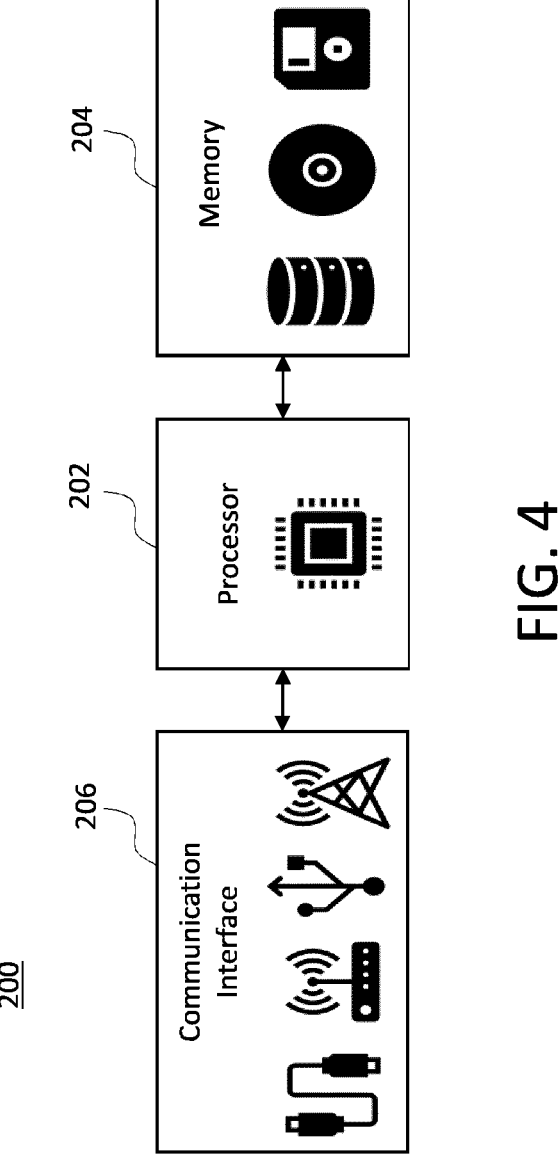
Figure 5:
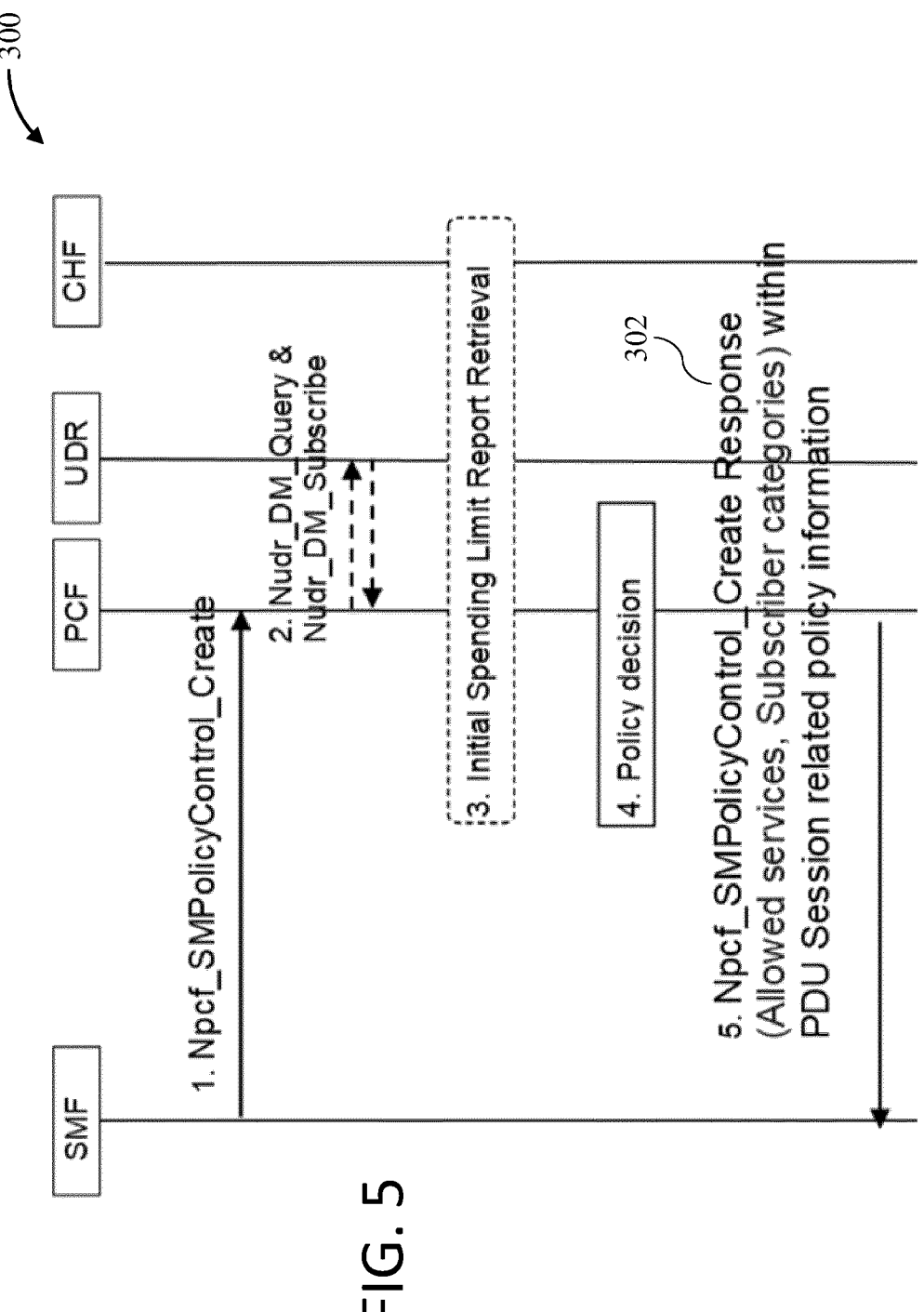
Figure 6:
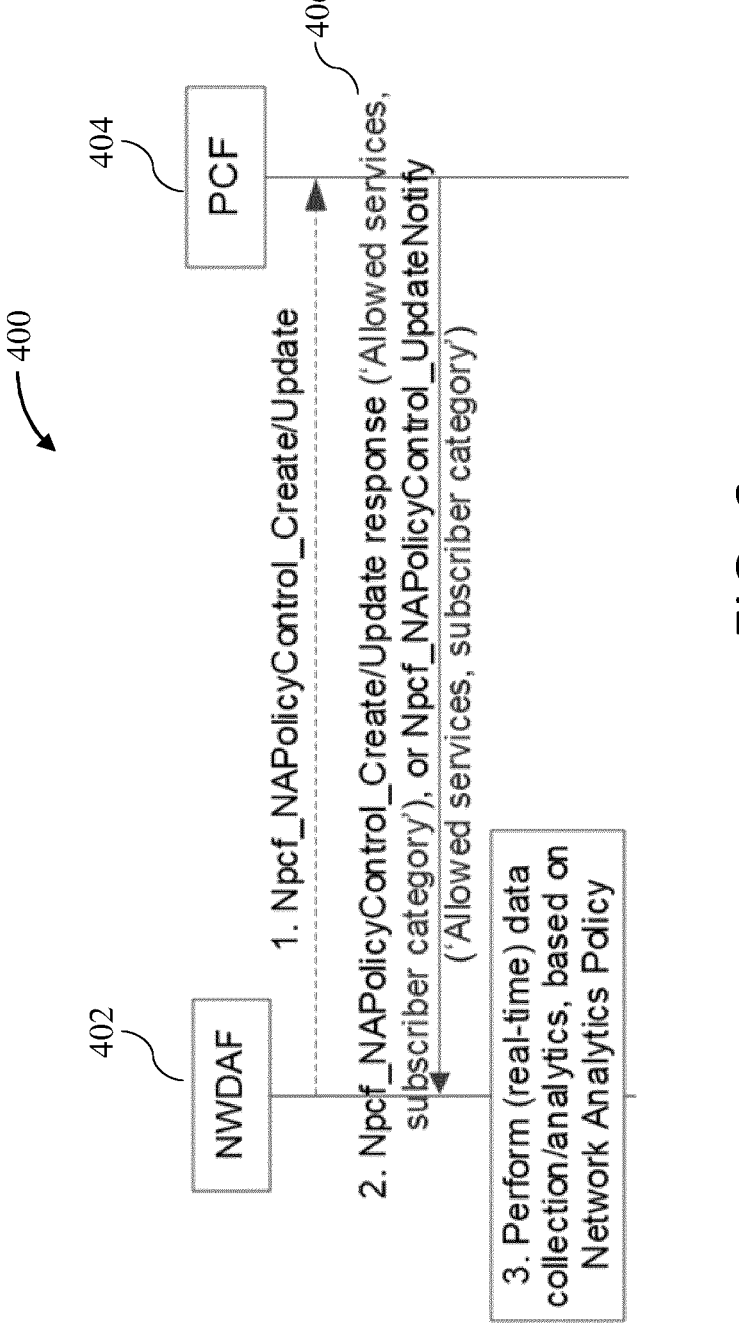
Figure 7:
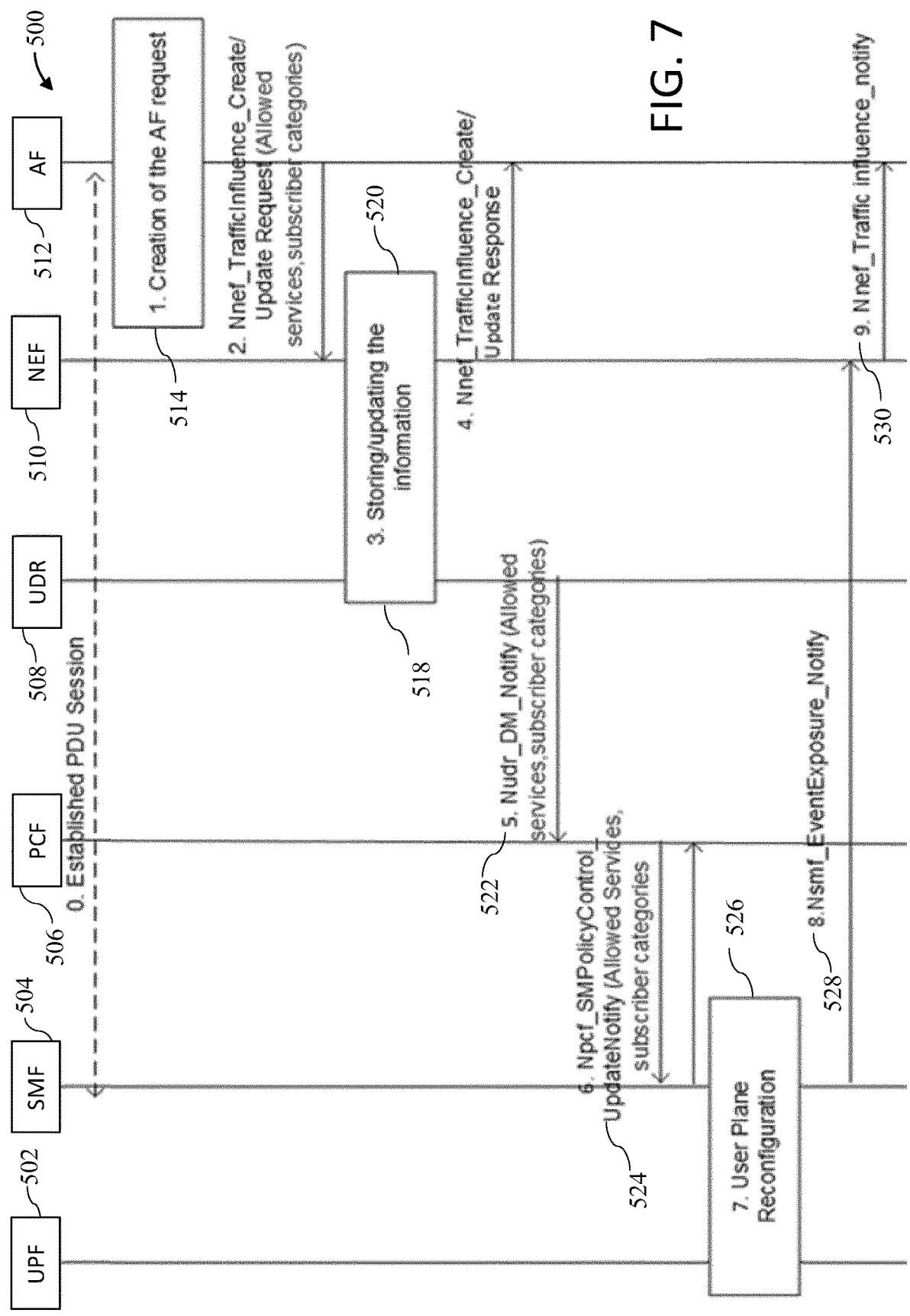
Figure 8:
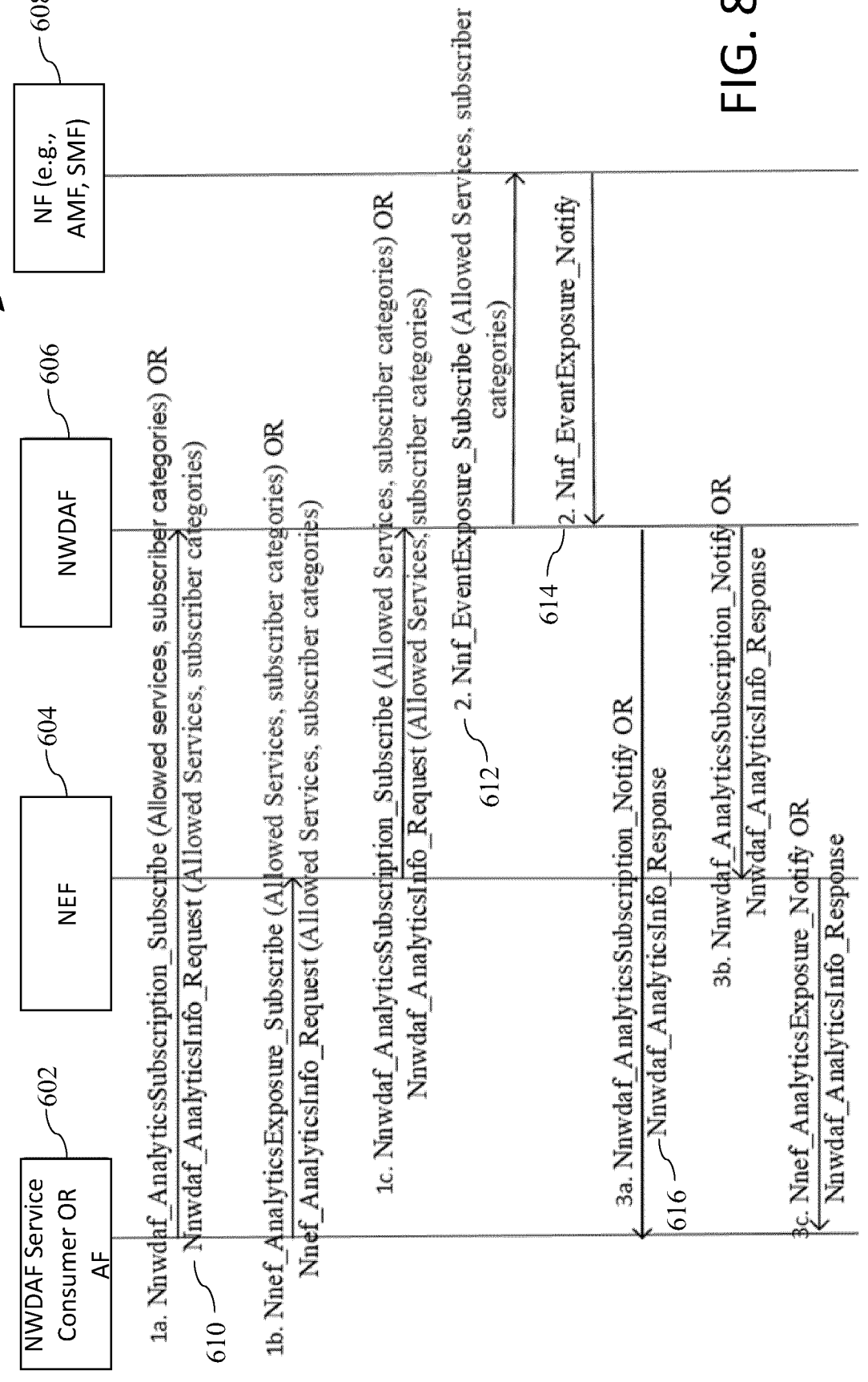

Having thus described embodiments of the disclosure in general terms, reference will now be made to the accompanying drawings, which are not necessarily drawn to scale, and wherein:

FIG. 1 illustrates an example architecture for a communications network, according to some embodiments;

FIG. 2 illustrates an example architecture for a communications network, according to some embodiments;

FIG. 3 illustrates an example architecture for a communications network, according to some embodiments;

FIG. 4 illustrates an example computing device for communicating over communication networks with other network entities, according to some embodiments;

FIG. 5 illustrates example communication process enhancements to Session Management (SM) policy association establishment, according to some embodiments;

FIG. 6 illustrates an example communication process for enhancements to provisioning of Network Analytics (NA) policy, according to some embodiments;

FIG. 7 illustrates an example communication process for an enhanced procedure to AF subscription to events and to routing influence, according to some embodiments;

FIG. 8 illustrates an example communication process for an enhanced procedure for analytics subscription information by network data analytics function (NWDAF) consumers and AFs via network exposure function (NEF), according to some embodiments;

FIG. 9 is a flow chart illustrating the operations performed, such as by a NWDAF, according to some embodiments;

FIG. 10 is a flow chart illustrating the operations performed, such as by a NEF, according to some embodiments;

FIG. 11 is a flow chart illustrating the operations performed, such as by a AF, according to some embodiments;

FIG. 12 is a flow chart illustrating the operations performed, such as by a NEF, according to some embodiments; and FIG. 13 is a flow chart illustrating the operations performed, such as by a Policy Charging Function (PCF), according to some embodiments.

DETAILED DESCRIPTION

Some embodiments of the present invention will now be described more fully hereinafter with reference to the accompanying drawings, in which some, but not all, embodiments of the invention are shown. Indeed, various embodiments of the invention can be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like reference numerals refer to like elements throughout. As used herein, the terms "data," "content," "information," and similar terms can be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Additionally, as used herein, the terms "node," "entity," "intermediary," "intermediate entity," "go-between," and similar terms can be used interchangeably to refer to computers connected via, or programs running on, a network or plurality of networks capable of data creation, modification, deletion, transmission, receipt, and/or storage in accordance with embodiments of the present invention. Thus, use of any such terms should not be taken to limit the spirit and scope of embodiments of the present invention.

Additionally, as used herein, the terms "user equipment," "user device," "device," "apparatus," "mobile device," "personal computer," "laptop computer," "laptop," "desktop computer," "desktop," "mobile phone," "tablet," "smartphone," "smart device," "cellphone," "communication device," "user communication device," "terminal," and similar terms can be used interchangeably to refer to computers configured to access a network or plurality of networks for at least the purpose of wired or wireless transmission of communication signals in accordance with example embodiments. Thus, use of any such terms should not be taken to limit the spirit and scope of the disclosed embodiments.

As defined herein, a "computer-readable storage medium," which refers to a non-transitory physical storage medium (e.g., volatile or non-volatile memory device), can be differentiated from a "computer-readable transmission medium," which refers to an electromagnetic signal. Such a medium can take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of non-transitory computer-readable media include a magnetic computer readable medium (e.g., a floppy disk, hard disk, magnetic tape, any other magnetic medium), an optical computer readable medium (e.g., a compact disc read only memory (CD-ROM), a digital versatile disc (DVD), a Blu-Ray disc, or the like), a random access memory (RAM), a programmable read only memory (PROM), an erasable programmable read only memory (EPROM), a FLASH-EPROM, or any other non-transitory medium from which a computer can read. The term computer-readable storage medium is used herein to refer to any computer-readable medium except transmission media. However, it will be appreciated that where embodiments are described to use a computer-readable storage medium, other types of computer-readable mediums can be substituted for or used in addition to the computer-readable storage medium in alternative embodiments.

As part of 3GPP Release-15 and Release-16, architecture enhancements for a 5G system (5GS) has been proposed to support application function (AF) influencing traffic routing, for example specified in 3GPP TS 23.501 V16.6.0 § 5.6.7. Also, as part of a Release-17 study item on Edge Computing these are further being discussed and documented in, for example, 3GPP SA2 TR 23.748 version 1.0.0. However, currently an AF cannot request specific traffic routing for a category of UEs or for UEs having subscribed to specific services or tariff plans. Also, as part of 3GPP Release-15 and Release-16, architecture enhancements for a 5G system (5GS) has been proposed to support network data analytics services, for example specified in 3GPP TS 23.288 V16.5.0. Further enhancements for network data analytics are being discussed and documented in 3GPP TR 23.700-91 V1.0.0. However, the AF cannot influence analytics data for data consumers needed to be triggered in a 5G Core Network (5GC) for a specific category of UEs. NFs also cannot request analytics data for a specific category of UEs or for UEs having subscribed to specific services. These limitations can, for example, result in managing different data network name (DNN) (different virtual Data networks) and single network slice selection assistance information (S-NS-SAI) (different virtual 5GS networks) at a high cost in terms of network resources just for the sake of differentiating tariff plans, among other deficiencies.

In the following, certain embodiments are explained with reference to communication devices capable of communication via a wired and/or wireless network and communication systems serving such communication devices. Before explaining in detail some exemplifying embodiments, certain general principles of a wired and/or wireless communication system, access systems thereof, and communication devices are briefly explained with reference to FIGS. 1-3 to assist in understanding the technology underlying the described examples.

According to some embodiments, a communication device or terminal can be provided for wireless access via cells, base stations, access points or the like (e.g., wireless transmitter and/or receiver nodes providing access points for a radio access communication system and/or other forms of wired and/or wireless networks). Such wired and/or wireless networks include, but are not limited to, networks configured to conform to 2G, 3G, 4G, L 1E, 5G, and any other similar or yet to be developed future communication network standards. The present disclosure contemplates that any methods, apparatuses, computer program codes, and any portions or combination thereof can also be implemented with yet undeveloped communication networks and associated standards as would be developed in the future and understood by one skilled in the art in light of the present disclosure.

Access points and hence communications there through are typically controlled by at least one appropriate control apparatus so as to enable operation thereof and management of mobile communication devices in communication therewith. In some embodiments, a control apparatus for a node can be integrated with, coupled to, and/or otherwise provided for controlling the access points. In some embodiments, the control apparatus can be arranged to allow communications between a user equipment and a core network or a network entity of the core network. For this purpose, the control apparatus can comprise at least one memory, at least one data processing unit such as a processor or the like, and an input/output interface. Via the interface, the control apparatus can be coupled to relevant other components of the access point. The control apparatus can be configured to execute an appropriate software code to provide the control functions. It shall be appreciated that similar components can be provided in a control apparatus provided elsewhere in the network system, for example in a core network entity. The control apparatus can be interconnected with other control entities. The control apparatus and functions can be distributed between several control units. In some embodiments, each base station can comprise a control apparatus. In alternative embodiments, two or more base stations can share a control apparatus.

Access points and associated controllers can communicate with each other via a fixed line connection and/or via a radio interface. The logical connection between the base station nodes can be provided for example by an X2, an S1, and/or the like interface. This interface can be used for example for coordination of operation of the stations and performing reselection or handover operations. The logical communication connection between the initial communication node and the final communication node on the network can comprise a plurality of intermediary nodes. Additionally, any of the nodes can be added to and removed from the logical communication connection as required to establish and maintain a network function communication.

The communication device or user equipment can comprise any suitable device capable of at least receiving a communication signal comprising data. The communication signal can be transmitted via a wired connection, a wireless connection, or some combination thereof. For example, the device can be a handheld data processing device equipped with a radio receiver, a data processor and a user interface. Non-limiting examples include a mobile station (MS) such as a mobile phone or what is known as a 'smart phone', a portable computer such as a laptop or a tablet computer provided with a wireless interface card or other wireless interface facility, personal data assistant (PDA) provided with wireless communication capabilities, or any combinations of these or the like. Further examples include wearable wireless devices such as those integrated with watches or smart watches, eyewear, helmets, hats, clothing, earpieces with wireless connectivity, jewelry and so on, universal serial bus (USB) sticks with wireless capabilities, modem data cards, machine type devices or any combinations of these or the like.

In some embodiments, a communication device, e.g., configured for communication with the wireless network or a core network entity, can be exemplified by a handheld or otherwise mobile communication device (or user equipment UE). A mobile communication device can be provided with wireless communication capabilities and appropriate electronic control apparatus for enabling operation thereof. Thus, the communication device can be provided with at least one data processing entity, for example a central processing unit and/or a core processor, at least one memory and other possible components such as additional processors and memories for use in software and hardware aided execution of tasks it is designed to perform. The data processing, storage and other relevant control apparatus can be provided on an appropriate circuit board and/or in chipsets. Data processing and memory functions provided by the control apparatus of the communication device are configured to cause control and signaling operations in accordance with certain embodiments as described later in this description. A user can control the operation of the communication device by a suitable user interface such as a touch sensitive display screen or pad and/or a keypad, one of more actuator buttons, voice commands, combinations of these, or the like. A speaker and a microphone are also typically provided. Furthermore, a mobile communication device can comprise appropriate connectors (either wired or wireless) to other devices and/or for connecting external accessories, for example hands-free equipment, thereto.

In some embodiments, a communication device can communicate wirelessly via an appropriate apparatus for receiving and transmitting signals. In some embodiments, a radio unit can be connected to the control apparatus of the device. The radio unit can comprise a radio part and associated antenna arrangement. The antenna arrangement can be arranged internally or externally to the communication device.

FIGS. 1-3 illustrate various example architectures for a communications network 100 in which the various methods, apparatuses, and computer program products can be carried out and/or used. In some embodiments, the communications network 100 can comprise any suitable configuration, number, orientation, positioning, and/or dimensions of components and specialized equipment configured to provide an air interface (e.g., New Radio (NR)) for communication or connection between a User Equipment 102 (UE 102) and a Data Network 116 (DN 116) via a Core Network 101 (CN 101) of the communications network 100. The UE 102 can be associated with one or more devices associated with one or more NF service consumers. As illustrated in FIG. 1, a communications network 100 can be provided in which the UE 102 is in operable communication with a 5G Access Network such as the 5G AN 104 (e.g., (R)AN 104) (other 5G Access Network are possible such as Wireline Access network terminated at a W-AGF or an Untrusted Non 3GPP access Network terminated at a N3IWF), such as by way of a transmission tower, a base station, an access point, a network node, and/or the like. In some embodiments, the 5G access network (5G AN) 104 or (R)AN 104 can communicate with the CN 101 or a component or entity thereof. In some embodiments, the CN 101 can facilitate communication between the UE 102 and the DN 116, such as for sending data, messages, requests, and/or the like. However, it will be appreciated that where embodiments are described in conjunction with 5G AN (e.g., RAN), R(AN), and 5G, other types of networks may be developed in the future.

In some embodiments, the DN 116 or the CN 101 can be in communication with an Application Server (AS) or Application Function (AF) 112 (AS 112 or AF 112). The (R)AN 104, CN 101, DN 116, and/or AS/AF 112 can be associated with a Network Repository Function (NRF), Network Function (NF) service producer, Secure Copy Protocol (SCP), Security Edge Protection Proxy (SEPP), Policy Charging Function (PCF), the like, or any combination thereof.

In the context of a 5G network, such as illustrated in FIGS. 2 and 3, the communications network 100 can comprise a series of connected network devices and specialized hardware that is distributed throughout a service region, state, province, city, or country, and one or more network entities, which can be stored at and/or hosted by one or more of the connected network devices or specialized hardware. In some embodiments, the UE 102 can connect to the (R)AN 104, which can then relay the communications between the UE 102 and the CN 101, the CN 101 being connected to the DN 116, which can be in communication with one or more AS/AF 112. In some embodiments, the UE 102 can be in communication with a (R)AN 104 depicting any 5G AN, which can act as a relay between the UE 102 and other components or services of the CN 101. For instance, in some embodiments, the UE 102 can communicate with the (R)AN 104, which can in turn communicate with an Access and Mobility Management Function 108 (AMF 108). In other instance or embodiments, the UE 102 can communicate directly with the AMF 108. In some embodiments, the AMF 108 can be in communication with one or more network functions (NFs), such as an Authentication Server Function 120 (AUSF 120), a Network Slice Selection Function 122 (NSSF 122), a Network Repository Function 124 (NRF 124), a Policy Charging Function 114 (PCF 114), a Network Data Analytics Function 126 (NWDAF 126), a Unified Data Management function 118 (UDM 118), the AS/AF 112, a Session Management Function 110 (SMF 110), and/or the like.

In some embodiments, the SMF 110 can be in communication with one or more User Plane Functions 106 (UPF 106, UPF 106*a*, UPF 106*b*, collectively "UPF 106"). By way of example only, in some embodiments, the UPF 106 can be in communication with the (R)AN 104 and the DN 116. In other embodiments, the DN 116 can be in communication with a first UPF 106*a* and the (R)AN 104 can be in communication with a second UPF 106*b*, while the SMF 110 is in communication with both the first and second UPFs 106*a, b* and the first and second UPFs 106*a, b* are in communication each with the other.

In some embodiments, the UE 102 can comprise a single-mode or a dual-mode device such that the UE 102 can be connected to one or more (R)ANs104. In some embodiments, the (R)AN 104 can be configured to implement one or more Radio Access Technologies (RATs), such as Bluetooth, Wi-Fi, and Global System for Mobile Communications (GSM), Universal Mobile Telecommunications Service (UNITS), LTE or 5G NR, among others, that can be used to connect the UE 102 to the CN 101. In some embodiments, the (R)AN 104 can comprise or be implemented using a chip, such as a silicon chip, in the UE 102 that can be paired with or otherwise recognized by a similar chip in the CN 101, such that the (R)AN 104 can establish a connection or line of communication between the UE 102 and the CN 101 by identifying and pairing the chip within the UE 102 with the chip within the CN 101. In some embodiments, the (R)AN 104 can implement one or more base stations, towers or the like to communicate between the UE 102 and the AMF 108 of the CN 101.

In some embodiments, the communications network 100 or components thereof (e.g., base stations, towers, etc.) can be configured to communicate with a communication device (e.g., the UE 102) such as a cell phone or the like over multiple different frequency bands, e.g., FR1 (below 6 GHz), FR2 (mm Wave), other suitable frequency bands, sub-bands thereof, and/or the like. In some embodiments, the communications network 100 can comprise or employ massive Multiple Input and Multiple Output (massive MIMO) antennas. In some embodiments, the communications network 100 can comprise multi-user MIMO (MU-MIMO) antennas. In some embodiments, the communications network 100 can employ edge computing whereby the computing servers are communicatively, physically, computationally, and/or temporally closer to the communications device (e.g., UE 102) in order to reduce latency and data traffic congestion. In some embodiments, the communications network 100 can employ other technologies, devices, or techniques, such as small cell, low-powered RAN, beamforming of radio waves, WIFI-cellular convergence, Non-Orthogonal Multiple Access (NOMA), channel coding, and the like.

As illustrated in FIG. 3, the UE 102 can be configured to communicate with the (R)AN 104 in a N1 interface, e.g., according to a non-access stratum (NAS) protocol. In some embodiments, (R)AN 104 can be configured to communicate with the CN 101 or a component thereof (e.g., the AMF 108) in a N2 interface, e.g., in a control plane between a base station of the (R)AN v104 and the AMF 108. In some embodiments, the (R)AN 104 can be configured to communicate with the UPF 106 in a N3 interface, e.g., in a user plane. In some embodiments, the AMF 108 and/or the SMF 110 can be configured to communicate with other services or network entities within the CN 101 in various different interfaces and/or according to various different protocols. For instance, in some embodiments, the AMF 108 and/or the SMF 110 can be configured to communicate with the AUSF 120 in a Nausf interface or an N12 interface. In some embodiments, the AMF 108 and/or the SMF 110 can be configured to communicate with the NSSF 122 in an Nnssf interface. In some embodiments, the AMF 108 and/or the SMF 110 can be configured to communicate with the NRF 124 in a Nnrf interface. In some embodiments, the AMF 108 and/or the SMF 110 can be configured to communicate with the PCF 114 in a Npcf interface or an N7 interface. In some embodiments, the AMF 108 and/or the SMF 110 can be configured to communicate with the NWDAF 126 in a Nnwdaf interface. In some embodiments, the AMF 108 and/or the SMF 110 can be configured to communicate with the UDM 118 in a Nudm interface, an N8 interface, or an N10 interface. In some embodiments, the AMF 108 and/or the SMF 110 can be configured to communicate with the AS/AF 112 in a Naf interface. In some embodiments, the SMF 110 can be configured to communicate with the UPF 106 in a N4 interface, which can act as a bridge between the control plane and the user plane, such as acting as a conduit for a Protocol Data Unit (PDU) session during which information is transmitted between, e.g., the UE 102 and the CN 101 or components/services thereof.

It will be appreciated that certain example embodiments described herein arise in the context of a telecommunications network, including but not limited to a telecommunications network that conforms to and/or otherwise incorporates aspects of a 5th generation (5G) architecture. While FIGS. 1-3 illustrate various configurations and/or components of an example architecture of the communications network 100, many other systems, system configurations, networks, network entities, and pathways/protocols for communication therein are contemplated and considered within the scope of this present disclosure.

While the methods, devices/apparatuses, and computer program products/codes described herein are described within the context of a 5th generation core network (5GC) and system, such as illustrated in FIGS. 1-3 and described hereinabove, the described methods, devices, and computer program products can nevertheless be applied in a broader context within any suitable telecommunications system, network, standard, and/or protocol. It will be appreciated that the described methods, devices, and computer program products can further be applied to yet undeveloped future networks and systems as would be apparent to one skilled in the art in light of the present disclosure.

Turning now to FIG. 4, examples of an apparatus that may be embodied by the user equipment or by a network entity, such as a server or other computing device, e.g., user equipment (UE), Network Repository Function (NRF), Access and Mobility Management Function (AMF), or Session Management Function (SMF), are depicted in accordance with an example embodiment of the present disclosure. As described below in conjunction with the flowcharts, block diagrams, or the like of FIGS. 5-11, the apparatus 200 of an example embodiment can be configured to perform some or all of the functions described herein. In any instance, the apparatus 200 can more generally be embodied by a computing device, such as a server, a personal computer, a computer workstation, a cloud computing entity, or any other type of computing device including those functioning as user equipment and/or a component of a wireless network or a wireless local area network, e.g., an AMF, NRF, PCF, SMF, etc. Regardless of the manner in which the apparatus 200 is embodied, the apparatus of an example embodiment can be configured as shown in FIG. 4 so as to include, be associated with or otherwise be in communication with a processor 202 and a memory device 204 and, in some embodiments, and/or a communication interface 206. Although not illustrated, the apparatus of an example embodiment may also optionally include a user interface, such as a touch screen, a display, a keypad or the like.

The processor 202 (and/or co-processors or any other circuitry assisting or otherwise associated with the processor) can be in communication with the memory device 204 via a bus for passing information among components of the apparatus 200. The memory device can include, for example, one or more volatile and/or non-volatile memories, such as a non-transitory memory device. In other words, for example, the memory device can be an electronic storage device (e.g., a computer readable storage medium) comprising gates configured to store data (e.g., bits) that can be retrievable by a machine (e.g., a computing device like the processor). The memory device can be configured to store information, data, content, applications, instructions, or the like for enabling the apparatus to carry out various functions in accordance with an example embodiment. For example, the memory device could be configured to buffer input data for processing by the processor. Additionally or alternatively, the memory device could be configured to store instructions for execution by the processor.

The apparatus 200 can, in some embodiments, be embodied in various computing devices as described above. However, in some embodiments, the apparatus can be embodied as a chip or chip set. In other words, the apparatus can comprise one or more physical packages (e.g., chips) including materials, components and/or wires on a structural assembly (e.g., a baseboard). The structural assembly can provide physical strength, conservation of size, and/or limitation of electrical interaction for component circuitry included thereon. The apparatus can therefore, in some cases, be configured to implement an embodiment on a single chip or as a single "system on a chip." As such, in some cases, a chip or chipset can constitute means for performing one or more operations for providing the functionalities described herein.

The processor 202 can be embodied in a number of different ways. For example, the processor can be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor can include one or more processing cores configured to perform independently. A multi-core processor can enable multiprocessing within a single physical package. Additionally or alternatively, the processor can include one or more processors configured in tandem via the bus to enable independent execution of instructions, pipelining and/or multithreading.

In an example embodiment, the processor 202 can be configured to execute instructions stored in the memory device 204 or otherwise accessible to the processor. Alternatively or additionally, the processor can be configured to execute hard coded functionality. As such, whether configured by hardware or software methods, or by a combination thereof, the processor can represent an entity (e.g., physically embodied in circuitry) capable of performing operations according to an embodiment of the present disclosure while configured accordingly. Thus, for example, when the processor is embodied as an ASIC, FPGA or the like, the processor can be specifically configured hardware for conducting the operations described herein. Alternatively, as another example, when the processor is embodied as an executor of instructions, the instructions can specifically configure the processor to perform the algorithms and/or operations described herein when the instructions are executed. However, in some cases, the processor can be a processor of a specific device (e.g., an encoder and/or a decoder) configured to employ an embodiment of the present disclosure by further configuration of the processor by instructions for performing the algorithms and/or operations described herein. The processor can include, among other things, a clock, an arithmetic logic unit (ALU) and logic gates configured to support operation of the processor.

In embodiments that include a communication interface 206, the communication interface can be any means such as a device or circuitry embodied in either hardware or a combination of hardware and software that is configured to receive and/or transmit data from/to a network and/or any other device or module in communication with the apparatus 200, such as an NF, NRF, a base station, an access point, SCP, UE 102, radio access network, core network services, an application server/function, a database or other storage device, etc. In this regard, the communication interface can include, for example, an antenna (or multiple antennas) and supporting hardware and/or software for enabling communications with a wireless communication network. Additionally or alternatively, the communication interface can include the circuitry for interacting with the antenna(s) to cause transmission of signals via the antenna(s) or to handle receipt of signals received via the antenna(s). In some environments, the communication interface can alternatively or also support wired communication. As such, for example, the communication interface can include a communication modem and/or other hardware/software for supporting communication via cable, Digital Subscriber Line (DSL), Universal Serial Bus (USB) or other mechanisms. In some embodiments, a session management function can comprise a 5GC session management function for any suitable Control and User Plane Separation (CUPS) architecture, such as for the Gateway General Packet Radio Service Support Node (GGSN-C), Trusted Wireless Access Gateway (TWAG-C), Broadband Network Gateway Control and User Plane Separation (BNG-CUPS), N4-interface, Sxa-interface, Sxb-interface, Sxc-interface, Evolved Packet Core (EPC) Secure Web Gateway Control Plane Function (SWG-C), EPC Packet Data Network Gateway Control Plane Function (PGW-C), EPC Traffic Detection Function for Control Plane (TDF-C), and/or the like.

As illustrated, the apparatus 200 can include a processor 202 in communication with a memory 204 and configured to provide signals to and receive signals from a communication interface 206. In some embodiments, the communication interface 206 can include a transmitter and a receiver. In some embodiments, the processor 202 can be configured to control the functioning of the apparatus 200, at least in part. In some embodiments, the processor 202 can be configured to control the functioning of the transmitter and receiver by effecting control signaling via electrical leads to the transmitter and receiver. Likewise, the processor 202 can be configured to control other elements of apparatus 200 by effecting control signaling via electrical leads connecting the processor 202 to the other elements, such as a display or the memory 204.

The apparatus 200 can be capable of operating with one or more air interface standards, communication protocols, modulation types, access types, and/or the like. Signals sent and received by the processor 202 can include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, Asymmetric Digital Subscriber Line (ADSL), Data Over Cable Service Interface Specification (DOCSIS), and/or the like. In addition, these signals can include speech data, user generated data, user requested data, and/or the like.

For example, the apparatus 200 and/or a cellular modem therein can be capable of operating in accordance with various 1st generation (1G) communication protocols, 2nd generation (2G or 2.5G) communication protocols, 3rd generation (3G) communication protocols, 4th generation (4G) communication protocols, 5th generation (5G) communication protocols, Internet Protocol Multimedia Subsystem (IMS) communication protocols (for example, Session Initiation Protocol (SIP) and/or the like. For example, the apparatus 200 can be capable of operating in accordance with 2G wireless communication protocols Interim Standard 136 (IS-136), Time Division Multiple Access (TDMA), Global System for Mobile Communications (GSM), Interim Standard 95 (IS-95), Code Division Multiple Access (CDMA), and/or the like. In addition, for example, the apparatus 200 can be capable of operating in accordance with 2.5G wireless communication protocols General Packet Radio Service (GPRS), Enhanced Data GSM Environment (EDGE), and/or the like. Further, for example, the apparatus 200 can be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The NA 200 can be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 200 can be capable of operating in accordance with 4G wireless communication protocols, such as LTE Advanced, 5G, and/or the like as well as similar wireless communication protocols that can be subsequently developed. In some embodiments, the apparatus 200 can be capable of operating according to or within the framework of any suitable control and user plane separation (CUPS) architecture, such as for the gateway GPRS support node (GGSN-C), trusted wireless access gateway (TWAG-C), broadband network gateways (BNGs), N4-interface, Sxa-interface, Sxb-interface, Sxc-interface, evolved packet core (EPC) switching gap (SWG-C), EPC packet data network gateway (PGW-C), EPC traffic detection function (TDF-C), and/or the like. Indeed, although described herein in conjunction with operation with a 5G system, the apparatus and method may be configured to operate in conjunction with a number of other types of systems including systems hereinafter developed and implemented.

Some of the embodiments disclosed herein can be implemented in software, hardware, application logic, or a combination of software, hardware, and application logic. The software, application logic, and/or hardware can reside on memory 204, the processor 202, or electronic components, for example. In some example embodiments, the application logic, software or an instruction set is maintained on any one of various conventional computer-readable media. In the context of this document, a "computer-readable medium" can be any non-transitory media that can contain, store, communicate, propagate or transport the instructions for use by or in connection with an instruction execution system, apparatus, or device, such as a computer or data processor circuitry, with examples depicted at FIG. 4, computer-readable medium can comprise a non-transitory computer-readable storage medium that can be any media that can contain or store the instructions for use by or in connection with an instruction execution system, apparatus, or device, such as a computer.

With regard to systems, networks, devices, protocols, and methods such as those described above with regard to FIGS. 1-4, the present disclosure describes many embodiments in the context of a 5G system (5GS), however any other suitable network, communications system, and/or associated devices and network entities can embody the disclosed invention(s), including but not limited to 2nd generation (2G), 3rd generation (3G), 4th generation (4G), Long Term Evolution (LTE), and the like. According to some example embodiments, a 5G network is provided that has been designed as a Service Based Architecture (SBA), e.g., a system architecture in which the system functionality is achieved by a set of NFs providing services to other NFs authorized to access their services. As part of 3GPP Release-15 and Release-16, certain architecture enhancements for a 5G system (5GS) have been proposed to support network data analytics services, for example specified in 3GPP TS 23.501 version. As described herein a number of enhancements in regards to specific traffic routing are provided. For example, local traffic offloading may be relatively expensive and may apply only to UEs with specific tariff plans. In an example use case, a subscriber may purchase a subscription package for a specific service that requires traffic offload (e.g., a summer package to watch internet tv or a house security package where pictures of the surveillance cameras at home are to be processed as locally as possible), but the operator may want a single DNN for Internet access. In such case, the UE may support a single PDU Session or the operator avoids the burden of different networks (e.g., DNN, S-NSSAI, etc.) per service package. For users having subscribed to such a package, offloading of the corresponding traffic may be allowed, such as at the closest PSA UPF (User Plane Function). In this case, the operator may want to only do insertion of a very local PSA UPF only for users who have bought such a package. In another use case example, where commercial relationships with smartphone users rely on tariff plans (generally mapped to user category), it is very useful to have statistics on how the network behaves for users having such tariff plans. Analytics performed for all UEs may be costly in terms of network resources, so operators may preferably limit analytics on UE behavior or analytics to enhance service for UEs that are for a specific user category.

Currently, 3GPP TS 23.503 version 16.6.0 defines that a PCF (5GC Policy control Function) can use information on Subscriber category and on allowed services for the user to define user related policies. These policies may then be sent to the AMF and/or to the SMF (for PDU Session related policies) but do not contain information on Subscriber category and on allowed services for the user. Thus, PCF may read information on Subscriber category and on allowed services in policy control subscription stored in UDR to determine suitable policies for a UE. Currently the AF can influence traffic routing on a PDU Session (as defined in 3GPP TS 23.501 § 5.6.7 and in 3GPP TS 23.502 for Nnef_TrafficInfluence_Create/Update) by providing information (via a NEF API) that may target a list of UEs, a single UE, a group of UEs identified by a Group ID, or any UE, as defined in 3GPP TS 29.522. Likewise, 3GPP TS 23.288 defines how a 5GC NF can request from NWDAF (Network Data Analytics Function) analytics targeting specific UEs (identified by their UE ID, SUPI, or GPSI), a group of UEs or any UE (i.e. all UEs) as defined in 3GPP TS 23.288 § 6.1.3.

Information on the category of users and on users having subscribed to specific services is key for operators as they depict specific tariff plans and thus directly relate with the commercial agreements between users and operators. Alternatively, relying on user groups to group users that have a baseline smartphone usage of their subscriptions would be cumbersome for baseline smartphone subscriptions because this may mean creating tremendously huge user groups. Moreover, relying on DNN and/or S-NSSAI to isolate different services may be a solution when the services are very different in nature so as to segregate 5GS usage between smartphone, corporate services for different 3rd parties, vehicle-to-everything (V2X), Public Safety forces, and the like. However, it would be too costly to manage different DNN (different virtual Data networks) and S-NSSAI (different virtual 5GS networks) just for the sake of differentiating tariff plans.

As such, as described herein, in accordance with various embodiments, are example systems, apparatus, methods, and solutions for enhancing traffic routing for a session, such as a PDU Session, or for a NF when it wishes to contact the NWDAF for analytics data, to select specific UEs for the respective task by identifying target UEs that have subscribed to a certain service or that belong to a certain "subscriber category". In other words, identifying the target UEs via two new identifiers: "Allowed services" and "Subscriber category."

For example, in some embodiments, the described enhancements and approaches can be used for deployment of two new target identifiers: "Allowed services" and "Subscriber categories" as shown in Table 1, which follows:

TABLE 1

| Information name | Description | Category |
|---|---|---|
| Allowed services | List of subscriber's allowed service identifiers | Optional |
| Subscriber categories | List of category identifiers associated with the subscriber | Optional |

In an example embodiment, the new target identifiers are added in the following procedures: AF requests for traffic routing Nnef_TrafficInfluence_Create/Update, AF requests for analytics triggers, Requests for Data Analytics to NWDAF, and Requests for data collection towards 5GC NFs. In an example embodiment, the "subscriber category" as a target for analytics or Nnef_TrafficInfluence_Create/Update means any UE with such subscriber category. In this case and in an example embodiment, allowed services and subscriber categories as defined in TS 23.503 Table 6.2-2 cannot be sent on roaming interfaces as they refer to subscription plans of a given operator. This limitation is not an issue as Nnef_TrafficInfluence_Create/Update and NWDAF services are not defined on roaming interfaces. In some embodiments, the Nnef_TrafficInfluence_Create/Update service is modified to add "Allowed services, Subscriber categories" as a target identifier in TS 23.501 § 5.6.7. The Nnef_TrafficInfluence_Create/Update service may be further modified to add "Allowed services, Subscriber categories" to corresponding stage 3 3GPP TS 29.522 Table 5.4.3.3.2-1: Definition of type TrafficInfluSub. In another embodiment, the Nnef_TrafficInfluence_Create/Update service is modified to add "Allowed services, Subscriber categories" in the UDR data model: (Data Set=Application Data; Data Subset=AF traffic influence request information). In this case, Allowed services, and/or Subscriber categories may be added as data key for this UDR Data Set and Data Subset.

In some embodiments, for the AF requests for analytics triggers, the target identifier "Allowed services, Subscriber categories" is added as a new target identifier to the AF request for provisioning analytics subscription information as described in solution 75, clause 6.75.2 from 3GPP TR 23.700-91. In another example embodiment, the UDR data model is modified to add "Allowed services, Subscriber categories" in the UDR data model: (Data Set=Application Data; Data Subset=AF analytics influence request information). In this case, Allowed services, and/or Subscriber categories may be added as data key for this UDR Data Set and Data Subset. In some embodiments, the PCF is configured to retrieve the "Allowed services, Subscriber categories" from the UDR and use the information to derive analytics policies to be further conveyed to other NFs (including NWDAF) as described in further detail herein.

In another example embodiment, for requests for data analytics to NWDAF and for requests for data collection towards 5GC NFs, Allowed services, and/or Subscriber categories are added as target identifiers in 3GPP TS 23. 288 § 6.1.3 and thus in the definition of Nnwdaf_AnalyticsSubscription (3GPP TS 23.288 § 7.2) and in the definition of Nnwdaf_AnalyticsInfo_Request (3GPP TS 23.288 § 7.3).

Additionally, Allowed services, and/or Subscriber categories may be added as target identifiers for one or more of the following event exposure services: Namf_Event Exposure_Subscribe in 3GPP TS 23.502 clause 5.2.2.3.2; Nudm_EventExposure_Subscribe in 3GPP TS 23.502 clause 5.2.3.5.2; Npcf_EventExposure_Subscribe in 3GPP TS 23.502 clause 5.2.5.7.2; Nnef_EventExposure_Subscribe in 3GPP TS 23.502 clause 5.2.6.2.2; Nsmf_EventExposure_Subscribe in 3GPP TS 23.502 clause 5.2.8.3.3; and Naf_EventExposure_Subscribe in 3GPP TS 23.502 clause 5.2.19.2.2.

In some embodiments, for NWDAF to request information from other NFs about users related with an Allowed service and/or a Subscriber category, other NFs like AMF and SMF are configured to receive "Allowed services, Subscriber category" information from the PCF, via the existing UE context policy control subscription information or PDU session context policy control subscription information. In the example of SMF, the "Allowed services, Subscriber category" information is added to PDU Session related policy information defined in 3GPP TS 23.503 Table 6.4-1: PDU Session related policy information. This information may be provided by the PCF to the SMF, such as via one or more the following existing mechanisms: Npcf_SMPolicyControl_Create response as defined in 3GPP TS 23.502 § 4.16.4, Npcf_SMPolicyControl_Update response as defined in 3GPP TS 23.502 § 4.16.5.1 or Npcf_SMPolicyControl_UpdateNotify request as defined in 3GPP TS 23.502 § 4.16.5.2.

In the example of an AMF, the "Allowed services, Subscriber category" information may be added to access and mobility related policy control information defined in 3GPP TS 23.503 Table 6.5-1: Access and mobility related policy control information; This information may be provided by the PCF to the AMF via one or more of the following existing mechanisms: Npcf_AMPolicyControl_Create as defined in 3GPP TS 23.502 § 4.16.1.2, Npcf_AMPolicyControl_Update response as defined in 3GPP TS 23.502 § 4.16.2.1 or Npcf_AMPolicyControl_UpdateNotify request as defined in 3GPP TS 23.502 § 4.16.2.2. Additionally or alternatively, the AMF and SMF may directly retrieve the "Allowed services, Subscriber category" from the UDR.

FIG. 5 illustrates a system 300 for enhancements to SM Policy association establishment. Similar enhancements apply to AM policy association establishment procedure as per FIG. 4.16.1.2-1 from 3GPP TS 23.502 version 16.5.1. As depicted by operation 302 of FIG. 5, the "Allowed services, Subscriber category" information is provided by a PCF to a SMF via one of more of the following existing mechanisms: Npcf_SMPolicyControl_Create response as defined in 3GPP TS 23.502 § 4.16.4, Npcf_SMPolicyControl_Update response as defined in 3GPP TS 23.502 § 4.16.5.1 or Npcf_SMPolicyControl_UpdateNotify request as defined in 3GPP TS 23.502 § 4.16.5.2.

FIG. 6 illustrates a system 400 for enhancements to provisioning of Network Analytics (NA) Policy (based on the procedure in 3GPP TR 23.700-91, clause 6.73.4.1). As illustrated in FIG. 6, PCF 404 retrieves the "Allowed services, Subscriber categories" from a unified data repository (UDR) and uses the information to derive analytics policies to be further conveyed to other 5GC NFs (including NWDAF 402). See operation 406. These policies may refer to the "Allowed services" and/or "Subscriber categories" information attached to subscriptions or may be derived from "Allowed services" and/or "Subscriber categories" information attached to subscriptions. In some embodiments and as shown in FIG. 6, The NWDAF 402 may also receive policy control data including information about the user related to the one or more subscriber categories related with the user and/or related to the one or more allowed services subscribed for the user. The one or more subscriber categories comprises one or more category identifiers associated with a subscriber and the one or more allowed services comprises one or more allowed service identifiers.

In some embodiments, the PCF 404 as illustrated in FIG. 6, for instance, receives a notification from a data repository of at least one changed subscription. In response, the PCF 404 may determine whether existing analytics policies are impacted by the at least one changed description wherein this determination may use one or more subscriber categories and/or one or more allowed services. The PCF 404 may then cause transmission of a policy control update to another network function comprising updated analytics policies.

FIG. 7 illustrates a system 500 for enhanced procedure to provide for AF subscription to events and to routing influence. As illustrated, the system 500 can include an UPF 502, a SMF 504, a PCF 506, a UDR 508, a NEF 510, and an AF 512. In some embodiments, in an instance in which there is an established PDU session, the system 500 is configured such that the AF 512 is triggered to possibly initiate event subscription and to influence traffic routing as shown in operation 514. In operation 516, the AF 512 sends to the NEF 510, a Nnef_TrafficInfluence_create request or a Nnef_TrafficInfluence_Update request, and includes Notification Correlation ID, UE ID, etc. as defined in clause 5.2.6.7 of TS 23.502. Additionally it includes Subscriber categories and/or allowed services thus providing a list of category identifiers associated with the UE targets of the request. This information may be associated with a target identifying any UE or UE members of a group. The NEF 510 is then configured to store the AF requested information in the UDR (Data Set=Application Data; Data Subset=AF traffic influence request information, Data Key=AF Transaction Internal ID, S-NSSAI and DNN and/or Internal Group Identifier or SUPI, Subscriber categories, allowed services) as depicted in operation 518. The NEF 510 is then configured to provide acknowledgement to AF 512 by sending a Nnef_TrafficInfluence_Create or update response message (See operation 520). In operation 522, the UDR 508 notifies the PCF 506 of the changed subscription via the Nudr_DM_Notify procedure. The PCF 506 is then configured to determine that existing PDU Sessions are potentially impacted by the AF request, and so the PCF 506 updates the SMF 504 with corresponding new policy and charging control (PCC) rule(s) by invoking Npcf_SMPolicyControl_UpdateNotify service operation as depicted in operation 524 (for new PDU Sessions the PCF would use Npcf_SMPolicyControl_Create). Based on the updated PCC rules received from PCF 506, SMF 504 may decide to reconfigure the user plane (e.g., change in DNAI, PSA relocation and the like) as shown in operation 526. Finally, as shown in operations 528 and 530, the SMF 504 may if requested by the policy information received in step 524, transmit the Nsmf_EventExposure_Notify procedure which indicates the changes in the user plane management information to AF 512 either directly or via NEF 510. In some embodiments, the SMF 504 may receiving a notification from a data repository of at least one changed service quality rule, wherein the at least one changed service quality rule is based on at least one changed subscription. The SMF 504 may further identify a procedure associated with the changed service quality rule. The procedure comprising reconfiguration of user plane path or reconfiguration of traffic steering at a user plane function. In some embodiments, the SMF 504 may cause transmission of a user plane management information update associated with the identified procedure.

Note that the transfer from PCF 506 to SMF 504 of Allowed services and/or Subscriber categories in step 524 is not required by this use case but may take place to support analytics use cases as described in FIG. 5 and FIG. 8.

As illustrated in FIG. 7, for instance, the NEF 510, may receive from an application function such as AF 512, in a communications system, a traffic influence request comprising traffic influence information (e.g., request 516 of FIG. 7). In response, the NEF 510 stores the traffic influence information in a data repository. In some embodiments, the traffic influence information including one or more subscriber categories and/or one or more allowed services. The NEF 510 is further configured to cause transmission of a traffic influence response (e.g., response 520 of FIG. 7) to the application function such as AF 512, indicating acknowledgement of the traffic influence information.

In another embodiment, the AF 512 receives a notification from a data repository such as a UDR of at least one changed subscription. In some embodiments, the PCF provides such information about the at least one changed subscription to the AF 512. The AF 512 may then determine whether existing protocol data unit sessions are impacted by the at least one changed description wherein this determination may use one or more subscriber categories and/or one or more allowed services. Once the impacted protocol data unit sessions are identified, the AF 512 is further configured to cause transmission of a policy control update to a session management function comprising updated policy and charging control rules for each of the impacted protocol data unit sessions. In this case, the session management function comprises updated policy and charging control rules for each of the impacted protocol data unit sessions.

FIG. 8 illustrates a system 600 for an enhanced procedure of an example embodiment for analytics subscribe/info request and notification/response by NWDAF Service Consumers or AFs 602 and NWDAF 606 via NEF 604. In FIGS. 8, 610 1*a* and 616 3*a* are analytics subscription/info request/responses between NWDAF Service consumer or AF 602 and NWDAF 606. 610 1*b*, 616 1*c* and 616 3*b*, 616 3*c* are analytics subscription/info request/response by AF 602 via NEF 604. Parameters provided in the request are as per clause 6.1.3 in 3GPP TS 23.288, but additionally they include Subscriber categories and/or Allowed services. The NWDAF 606 is then configured to collect data from other NFs 608 using the subscriber categories and/or allowed services as an input, and the NFs 608 know which UE to track since they previously received the information of the subscriber category and allowed services of the users they serve from the PCF (e.g., per FIG. 5).

As illustrated in FIG. 8, for instance, the NWDAF 606 receives, from a network function consumer or an application function (e.g., NWDAF Service consumer or AF 602)

in a communications system, an analytics subscription request, the analytics subscription request comprising one or more subscriber categories and/or one or more allowed services as shown by 610 1*a*. In response, the NWDAF 606 is configured to cause transmission of an event exposure request (e.g., request 612 of FIG. 8) to at least one network function such as NEF 608. In some embodiments, the event exposure request comprises the one or more subscriber categories and/or the one or more allowed services. In some embodiments, the NWDAF 606 is further configured to collect data specific to user equipment corresponding to the one or more subscriber categories and/or the one or more allowed services from other network functions. In this case, by collecting the one or more subscriber categories and/or the one or more allowed services from other network functions and the at least one network function being operable to cause the other network functions and the at least one network function to track a corresponding set of particular user equipment. In yet another embodiment, the NWDAF 606 may receive information about a user related to the one or more subscriber categories related with the user and/or related to the one or more allowed services subscribed for the user. The NWDAF 606 may also receive policy control data including information about the user related to the one or more subscriber categories related with the user and/or related to the one or more allowed services subscribed for the user. The one or more subscriber categories comprises one or more category identifiers associated with a subscriber and the one or more allowed services comprises one or more allowed service identifiers.

FIG. 9 illustrates a flowchart of the operations of an example method 900 performed by an example apparatus 200 which, in one embodiment, may be embodied by a computer program product comprising computer program code executed by the processor 202. As shown in block 901, apparatus 200 of this example embodiment incudes means, such as the processor 202, the memory 204, the communication interface 206 or the like, for receiving, from a network function consumer or an application function, in a communications system, an analytics subscription request, the analytics subscription request comprising one or more subscriber categories and/or one or more allowed services. As shown in block 902, the apparatus 200 may also include means, such as the processor 202 or the like, for causing transmission of an event exposure request to at least one network function, the event exposure request comprising the one or more subscriber categories and/or the one or more allowed services.

FIG. 10 illustrates another flowchart of the operations of an example method 1000 performed by an example apparatus 200 which, in one embodiment, may be embodied by a computer program product comprising computer program code executed by processor 202. As shown in block 1001, apparatus 200 of this example embodiment includes means, such as the processor 202, the memory 204, the communication interface 206 or the like, for receiving, from an application function, in a communications system, a traffic influence request comprising traffic influence information, the traffic influence information including one or more subscriber categories and/or one or more allowed services. As shown in block 1002, the apparatus 200 may also include means, such as the processor 202 or the like, for storing the traffic influence information in a data repository. In block 1003, the apparatus 200 may also include means, such as the processor 202 or the like, for causing transmission of a traffic influence response to the application function indicating acknowledgement.

FIG. 11 illustrates another flowchart of the operations of an example method 1100 performed by an example apparatus 200 which, in one embodiment, may be embodied by a computer program product comprising computer program code executed by processor 202. As shown in block 1101, apparatus 200 of this example embodiment includes means, such as the processor 202, the memory 204, the communication interface 206 or the like, for receiving a notification from a data repository of at least one changed subscription. As shown in block 1102, the apparatus 200 may also include means, such as the processor 202 or the like, for determining whether existing protocol data unit sessions are impacted by the at least one changed description wherein this determination may use one or more subscriber categories and/or one or more allowed services. In block 1103, the apparatus 200 may also include means, such as the processor 202 or the like, for causing transmission of a policy control update to a session management function comprising updated policy and charging control rules for each of the impacted protocol data unit sessions.

FIG. 12 illustrates another flowchart of the operations of an example method 1200 performed by an example apparatus 200 which, in one embodiment, may be embodied by a computer program product comprising computer program code executed by processor 202. As shown in block 1201, apparatus 200 of this example embodiment includes means, such as the processor 202, the memory 204, the communication interface 206 or the like, for receiving, from an application function, in a communications system, an analytics influence request comprising analytics influence information, the analytics influence information including one or more subscriber categories and/or one or more allowed services. As shown in block 1202, the apparatus 200 may also include means, such as the processor 202 or the like, for storing the analytics influence information in a data repository. In block 1203, the apparatus 200 may also include means, such as the processor 202 or the like, for causing transmission of an analytics influence response to the application function indicating acknowledgement.

FIG. 13 illustrates a flowchart of the operations of an example method 1300 performed by an example apparatus 200 which, in one embodiment, may be embodied by a computer program product comprising computer program code executed by processor 202. As shown in block 1301, apparatus 200 of this example embodiment includes means, such as the processor 202, the memory 204, the communication interface 206 or the like, for receiving a notification from a data repository of at least one changed subscription. In block 1302, the apparatus 200 may also include means, such as the processor 202 or the like, for determining whether existing analytics policies are impacted by the at least one changed description wherein this determination may use one or more subscriber categories and/or one or more allowed services. As shown in block 1303, the apparatus 200 may also include means, such as the processor 202 or the like, for causing transmission of a policy control update to another network function comprising updated analytics policies.

As described above, the referenced flowcharts of methods that can be carried out by an apparatus according to related computer program products comprising computer program code. It will be understood that each block of the flowcharts, and combinations of blocks in the flowcharts, can be implemented by various means, such as hardware, firmware, processor, circuitry, and/or other devices associated with execution of software including one or more computer program instructions. For example, one or more of the procedures described above can be embodied by computer program instructions. In this regard, the computer program instructions which embody the procedures described above can be stored by a memory device, e.g., 204, of an apparatus, e.g., 200, employing an embodiment of the present invention and executed by processor, e.g., 202, of the apparatus. As will be appreciated, any such computer program instructions can be loaded onto a computer or other programmable apparatus (e.g., hardware) to produce a machine, such that the resulting computer or other programmable apparatus implements the functions specified in the flowchart blocks. These computer program instructions can also be stored in a computer-readable memory that can direct a computer or other programmable apparatus to function in a particular manner, such that the instructions stored in the computer-readable memory produce an article of manufacture, the execution of which implements the function specified in the flowchart blocks. The computer program instructions can also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above. In other embodiments, the computer program instructions, such as the computer-readable program code portions, need not be stored or otherwise embodied by a non-transitory computer-readable storage medium, but can, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations, methods, steps, processes, or the like, above can be modified or further amplified. Furthermore, in some embodiments, additional optional operations, methods, steps, processes, or the like, can be included. Modifications, additions, subtractions, inversions, correlations, proportional relationships, disproportional relationships, attenuation and/or amplifications to the operations above can be performed in any order and in any combination. It will also be appreciated that in instances where particular operations, methods, steps, processes, or the like, required particular hardware such hardware should be considered as part of apparatus 200 for any such embodiment. For example, as described above where a GPS is used to determine the location of apparatus 200 such appropriate GPS modules and hardware should be considered integral to apparatus 200.

A method, apparatus, and computer program product are provided for enhanced traffic routing. According to a first embodiment, a method is provided that comprises: receiving, from a network function consumer or an application function, in a communications system, an analytics subscription request. The analytics subscription request comprising one or more subscriber categories and/or one or more allowed services. In some embodiments, the method can further comprise causing transmission of an event exposure request to at least one network function. The event exposure request comprising the one or more subscriber categories and/or the one or more allowed services.

In some embodiments, the method can further comprise collecting data specific to user equipment corresponding to the one or more subscriber categories and/or the one or more allowed services from other network functions, the collection of the one or more subscriber categories and/or the one or more allowed services from other network functions and the at least one network function being operable to cause the other network functions and the at least one network function to track a corresponding set of particular user equipment.

The method can further comprise receiving policy control data including information about the user related to the one or more subscriber categories related with the user and/or related to the one or more allowed services subscribed for the user. In some embodiments, the one or more subscriber categories comprises one or more category identifiers associated with a subscriber. In some embodiments, the one or more allowed services comprises one or more allowed service identifiers.

According to a second embodiment, a method is provided that comprises receiving, from an application function, in a communications system, a traffic influence request comprising traffic influence information. The traffic influence information includes one or more subscriber categories and/or one or more allowed services. In some embodiments the method further comprises storing the traffic influence information in a data repository and causing transmission of a traffic influence response to the application function indicating acknowledgement.

According to a third embodiment, a method is provided that comprises: receiving a notification from a data repository of at least one changed subscription, determining whether existing protocol data unit sessions are impacted by the at least one changed description wherein this determination may use one or more subscriber categories and/or one or more allowed services, and causing transmission of a policy control update to a session management function comprising updated policy and charging control rules for each of the impacted protocol data unit sessions. In some embodiments, the session management function is operable to cause changes in a user plane management information in response to the updated policy and charging control rules for each of the impacted protocol data unit sessions.

According to a fourth embodiment, a method is provided that comprises receiving, from an application function, in a communications system, an analytics influence request comprising analytics influence information. The analytics influence information includes one or more subscriber categories and/or one or more allowed services. In some embodiments the method further comprises storing the analytics influence information in a data repository and causing transmission of an analytics influence response to the application function indicating acknowledgement.

According to a fifth embodiment, a method is provided that comprises: receiving a notification from a data repository of at least one changed subscription, determining whether existing analytics policies are impacted by the at least one changed description wherein this determination may use one or more subscriber categories and/or one or more allowed services, and causing transmission of a policy control update to another network function comprising updated analytics policies. In some embodiments, the another network function is operable to cause changes in analytics requests in response to the updated analytics policy.

According to a sixth embodiment, an apparatus is provided that comprises: at least one processer; and at least one memory including computer program code, the at least one memory and the computer program code configured to, with the at least one processor, cause the apparatus at least to: receive, from a network function consumer or an application function, in a communications system, an analytics subscription request, and cause transmission of an event exposure request to at least one network function.

In some embodiments, the at least one memory and the computer program code are further configured to, with the at least one processor, cause the apparatus to collect data specific to user equipment corresponding to the one or more subscriber categories and/or the one or more allowed services from other network functions, the collection of the one or more subscriber categories and/or the one or more allowed services from other network functions and the at least one network function being operable to cause the other network functions and the at least one network function to track a corresponding set of particular user equipment.

The at least one memory and the computer program code are further configured to, with the at least one processor, cause the apparatus to receive policy control data including information about the user related to the one or more subscriber categories related with the user and/or related to the one or more allowed services subscribed for the user.

According to a seventh embodiment, an apparatus is provided that comprises: at least one processer; and at least one memory including computer program code, the at least one memory and the computer program code configured to, with the at least one processor, cause the apparatus at least to receive, from an application function, in a communications system, a traffic influence request comprising traffic influence information. In some embodiments the at least one memory and the computer program code are further configured to, with the at least one processor, cause the apparatus to store the traffic influence information in a data repository and causing transmission of a traffic influence response to the application function indicating acknowledgement.

According to an eighth embodiment, an apparatus is provided that comprises: at least one processer; and at least one memory including computer program code, the at least one memory and the computer program code configured to: receive a notification from a data repository of at least one changed subscription, determine whether existing protocol data unit sessions are impacted by the at least one changed description wherein this determination may use one or more subscriber categories and/or one or more allowed services, and cause transmission of a policy control update to a session management function comprising updated policy and charging control rules for each of the impacted protocol data unit sessions. In some embodiments, the session management function is operable to cause changes in a user plane management information in response to the updated policy and charging control rules for each of the impacted protocol data unit sessions.

According to a ninth embodiment, an apparatus is provided that comprises: at least one processer; and at least one memory including computer program code, the at least one memory and the computer program code configured to receive, from an application function, in a communications system, an analytics influence request comprising analytics influence information, store the analytics influence information in a data repository, and cause transmission of an analytics influence response to the application function indicating acknowledgement.

According to a tenth embodiment, an apparatus is provided that comprises: at least one processer; and at least one memory including computer program code, the at least one memory and the computer program code configured to receive a notification from a data repository of at least one changed subscription, determine whether existing analytics policies are impacted by the at least one changed description wherein this determination may use one or more subscriber categories and/or one or more allowed services, and cause transmission of a policy control update to another network function comprising updated analytics policies. In some embodiments, the another network function is operable to cause changes in analytics requests in response to the updated analytics policy.

According to an eleventh embodiment, a computer program product is provided that comprising a non-transitory computer readable storage medium having program code portions stored thereon, the program code portions configured, upon execution, to: receive, from a network function consumer or an application function, in a communications system, an analytics subscription request, and cause transmission of an event exposure request to at least one network function.

In some embodiments, the program code portions are further configured to collect data specific to user equipment corresponding to the one or more subscriber categories and/or the one or more allowed services from other network functions, the collection of the one or more subscriber categories and/or the one or more allowed services from other network functions and the at least one network function being operable to cause the other network functions and the at least one network function to track a corresponding set of particular user equipment.

The program code portions are further configured to receive policy control data including information about the user related to the one or more subscriber categories related with the user and/or related to the one or more allowed services subscribed for the user.

According to a twelfth embodiment, a computer program product is provided that comprising a non-transitory computer readable storage medium having program code portions stored thereon, the program code portions configured, upon execution, to receive, from an application function, in a communications system, a traffic influence request comprising traffic influence information. In some embodiments the program code portions are further configured to store the traffic influence information in a data repository and causing transmission of a traffic influence response to the application function indicating acknowledgement.

According to a thirteenth embodiment, a computer program product is provided that comprising a non-transitory computer readable storage medium having program code portions stored thereon, the program code portions configured, upon execution, to: receive a notification from a data repository of at least one changed subscription, determine whether existing protocol data unit sessions are impacted by the at least one changed description wherein this determination may use one or more subscriber categories and/or one or more allowed services, and cause transmission of a policy control update to a session management function comprising updated policy and charging control rules for each of the impacted protocol data unit sessions. In some embodiments, the session management function is operable to cause changes in a user plane management information in response to the updated policy and charging control rules for each of the impacted protocol data unit sessions.

According to a fourteenth embodiment, a computer program product is provided that comprising a non-transitory computer readable storage medium having program code portions stored thereon, the program code portions configured, upon execution, to receive, from an application function, in a communications system, an analytics influence request comprising analytics influence information, store the analytics influence information in a data repository, and cause transmission of an analytics influence response to the application function indicating acknowledgement.

According to a fifteenth embodiment, a computer program product is provided that comprising a non-transitory computer readable storage medium having program code portions stored thereon, the program code portions configured, upon execution, to receive a notification from a data repository of at least one changed subscription, determine whether existing analytics policies are impacted by the at least one changed description wherein this determination may use one or more subscriber categories and/or one or more allowed services, and cause transmission of a policy control update to another network function comprising updated analytics policies. In some embodiments, the another network function is operable to cause changes in analytics requests in response to the updated analytics policy.

According to a sixteenth embodiment, an apparatus is provided that comprises: means for receiving, from a network function consumer or an application function, in a communications system, an analytics subscription request. In some embodiments, the apparatus can further comprise means for causing transmission of an event exposure request to at least one network function.

In some embodiments, the apparatus can further comprise means for collecting data specific to user equipment corresponding to the one or more subscriber categories and/or the one or more allowed services from other network functions, the collection of the one or more subscriber categories and/or the one or more allowed services from other network functions and the at least one network function being operable to cause the other network functions and the at least one network function to track a corresponding set of particular user equipment. The apparatus can further comprise means for receiving policy control data including information about the user related to the one or more subscriber categories related with the user and/or related to the one or more allowed services subscribed for the user.

According to a seventeenth embodiment, an apparatus is provided that comprises means for receiving, from an application function, in a communications system, a traffic influence request comprising traffic influence information. In some embodiments the apparatus further comprises means for storing the traffic influence information in a data repository and causing transmission of a traffic influence response to the application function indicating acknowledgement.

According to a eighteenth embodiment, an apparatus is provided that comprises: means for receiving a notification from a data repository of at least one changed subscription, means for determining whether existing protocol data unit sessions are impacted by the at least one changed description wherein this determination may use one or more subscriber categories and/or one or more allowed services, and causing transmission of a policy control update to a session management function comprising updated policy and charging control rules for each of the impacted protocol data unit sessions. In some embodiments, the session management function is operable to cause changes in a user plane management information in response to the updated policy and charging control rules for each of the impacted protocol data unit sessions.

According to a nineteenth embodiment, an apparatus is provided that comprises means for receiving, from an application function, in a communications system, an analytics influence request comprising analytics influence information. The analytics influence information includes one or more subscriber categories and/or one or more allowed services. In some embodiments the apparatus further comprises means for storing the analytics influence information in a data repository and causing transmission of an analytics influence response to the application function indicating acknowledgement.

According to a twentieth embodiment, an apparatus is provided that comprises: means for receiving a notification from a data repository of at least one changed subscription, means for determining whether existing analytics policies are impacted by the at least one changed description wherein this determination may use one or more subscriber categories and/or one or more allowed services, and causing transmission of a policy control update to another network function comprising updated analytics policies. In some embodiments, the another network function is operable to cause changes in analytics requests in response to the updated analytics policy.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the appended claims. In this regard, for example, different combinations of elements and/or functions than those explicitly described above are also contemplated as can be set forth in some of the appended claims. Although specific terms are employed herein, they are used in a generic and descriptive sense only and not for purposes of limitation.

That which is claimed is:

1. A method comprising:
  receiving a notification from a data repository of at least one changed subscription;
  determining at least one existing protocol data unit session is impacted by the at least one changed subscription, wherein the at least one changed subscription indicates at least one or more subscriber categories and one or more allowed services;
  causing transmission of a policy control update to a session management function, the policy control update comprising at least one updated policy and charging control rule for the at least one existing protocol data unit session; and wherein the policy control update is configured to cause the session management function to change user plane management information based on the at least one updated policy and charging control rule for the at least one existing protocol data unit session.

2. The method of claim 1, wherein the at least one existing protocol data session comprises a plurality of existing protocol data unit sessions, and wherein the at least one updated policy and charging control rule comprises a plurality of updated policy and charging control rules for each of the plurality of existing protocol data unit sessions.

3. The method of claim 1, further comprising an access function sending a request for provisioning analytics subscription information, the request including analytics triggers, wherein target identifiers for the analytics triggers include allowed services and subscriber categories.

4. The method of claim 1, further comprising adding allowed services and subscriber categories in a unified data repository data model, and adding allowed services and subscriber categories as data key for a UDR data set and data subset, wherein a policy control function retrieves the allowed services and the subscriber categories from the unified data repository and uses the information to derive analytics policies to and convey the analytics policies to other network functions.

5. A non-transitory computer readable medium comprising instructions which, when executed by an apparatus, cause the apparatus to perform at least the following:
  receiving a notification from a data repository of at least one changed subscription;
  determining at least one existing protocol data unit session is impacted by the at least one changed subscription, wherein the at least one changed subscription indicates at least one or more subscriber categories and one or more allowed services;
  causing transmission of a policy control update to a session management function, the policy control update comprising at least one updated policy and charging control rule for the at least one existing protocol data unit session; and
  wherein the policy control update is configured to cause the session management function to change user plane management information based on the at least one updated policy and charging control rule for the at least one existing protocol data unit session.

6. An apparatus comprising:
  at least one processer; and
  at least one memory storing instructions that when executed by the at least one processor, cause the apparatus at least to perform:
    receiving a notification from a data repository of at least one changed subscription;
    determining at least one existing analytics policy is impacted by the at least one changed subscription, wherein the at least one changed subscription indicates at least one or more subscriber categories and one or more allowed services;
    causing transmission of a policy control update to another network function, the policy control update comprising at least one updated analytics policy; and
    wherein the policy control update is configured to cause the another network function to change an analytics request based on the at least one updated analytics policy.

7. The apparatus of claim 6 wherein the at least one existing analytics policy comprises a plurality of existing analytics policies, and wherein the at least one updated analytics policy comprises a plurality of updated analytics policies.

8. A method comprising:

receiving a notification from a data repository of at least one changed subscription;

determining at least one existing analytics policy is impacted by the at least one changed subscription, wherein the at least one changed subscription indicates at least one or more subscriber categories and one or more allowed services;

causing transmission of a policy control update to another network function, the policy control update comprising at least one updated analytics policy; and wherein the policy control update is configured to cause the another network function to change an analytics request based on the at least one updated analytics policy.

9. The method of claim 8 wherein the at least one existing analytics policy comprises a plurality of existing analytics policies, and wherein the at least one updated analytics policy comprises a plurality of updated analytics policies.

10. The method of claim 8, further comprising an access function sending a request for provisioning analytics subscription information, the request including analytics triggers, wherein target identifiers for the analytics triggers include allowed services and subscriber categories.

11. The method of claim 8, further comprising adding allowed services and subscriber in a unified data repository data model, and adding allowed services and subscriber categories are added as data key for a unified data repository data set and data subset, wherein a policy control function retrieves the allowed services and the subscriber categories from the unified data repository and uses the information to derive analytics policies and convey the analytics policies to other network functions.

12. A non-transitory computer readable medium comprising instructions which, when executed by an apparatus, cause the apparatus to perform at least the following:

receiving a notification from a data repository of at least one changed subscription;

determining at least one existing analytics policy is impacted by the at least one changed subscription, wherein the at least one changed subscription indicates at least one or more subscriber categories and one or more allowed services;

causing transmission of a policy control update to another network function, the policy control update comprising at least one updated analytics policy; and wherein the policy control update is configured to cause the another network function to change an analytics request based on the at least one updated analytics policy.

13. An apparatus comprising:

at least one processer; and at least one memory storing instructions that when executed by the at least one processor, cause the apparatus at least to perform:

receiving a notification from a data repository of at least one changed subscription;

determining at least one existing protocol data unit session is impacted by the at least one changed subscription, wherein the at least one changed subscription indicates at least one or more subscriber categories and one or more allowed services;

causing transmission of a policy control update to a session management function, the policy control update comprising at least one updated policy and charging control rule for the at least one existing protocol data unit session; and wherein the policy control update is configured to cause the session management function to change user plane management information based on the at least one updated policy and charging control rule for the at least one existing protocol data unit session.

14. The apparatus of claim 13, wherein the at least one existing protocol data session comprises a plurality of existing protocol data sessions, and wherein the at least one updated policy and charging control rule comprises a plurality of updated policy and charging control rules for each of the plurality of existing protocol data sessions.

* * * * *